(12) United States Patent
Kim

(10) Patent No.: US 9,207,678 B2
(45) Date of Patent: Dec. 8, 2015

(54) METHOD AND APPARATUS FOR CONSTRUCTING MAP FOR MOBILE ROBOT

(71) Applicant: Hanwha Techwin Co., Ltd., Changwon-Si (KR)

(72) Inventor: Dongshin Kim, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 7 days.

(21) Appl. No.: 14/037,510

(22) Filed: Sep. 26, 2013

(65) Prior Publication Data

US 2014/0334713 A1    Nov. 13, 2014

(30) Foreign Application Priority Data

May 7, 2013   (KR) ........................ 10-2013-0051497

(51) Int. Cl.
  *G06K 9/00*   (2006.01)
  *G05D 1/02*   (2006.01)
  *G06K 9/62*   (2006.01)

(52) U.S. Cl.
  CPC .......... *G05D 1/0246* (2013.01); *G06K 9/00664* (2013.01); *G06K 9/6261* (2013.01)

(58) Field of Classification Search
  CPC ..... G06K 9/00791; G06K 9/685; G06K 9/68; G06K 9/70; G06T 7/0042
  USPC ......... 382/181, 224, 225, 155, 159, 115, 100, 382/153; 701/533, 420, 423, 23; 901/1, 9, 901/4, 7; 700/104, 255, 259; 414/744.3
  See application file for complete search history.

(56) References Cited

U.S. PATENT DOCUMENTS

| | | | | |
|---|---|---|---|---|
| 6,392,705 | B1 * | 5/2002 | Chaddha | 348/388.1 |
| 6,493,607 | B1 * | 12/2002 | Bourne et al. | 700/255 |
| 7,194,134 | B2 * | 3/2007 | Bradshaw | 382/226 |
| 7,933,686 | B2 | 4/2011 | Myeong et al. | |
| 2013/0123987 | A1 * | 5/2013 | Kase et al. | 700/259 |

FOREIGN PATENT DOCUMENTS

| | | |
|---|---|---|
| JP | 2003-266349 A | 9/2003 |
| KR | 10-0791386 B1 | 1/2008 |
| KR | 10-2010-0062856 A | 6/2010 |
| KR | 10-2010-0070922 A | 6/2010 |

* cited by examiner

*Primary Examiner* — Sheela Chawan
(74) *Attorney, Agent, or Firm* — Sughrue Mion, PLLC

(57) ABSTRACT

A method and apparatus for constructing a map for a mobile robot to be able to reduce a data amount and increase an approach speed. The method includes: searching for a plurality of feature data occupying an arbitrary space by scanning a surrounding environment of the mobile robot; performing quadtree segmentation on first feature data of the plurality of feature data to generate a plurality of first node information as a result of the quadtree segmentation; determining a position of second feature data of the plurality of feature data with respect to the first feature data; and performing a neighborhood moving algorithm for generating a plurality of second node information of the second feature data according to the position of second feature data by using the plurality of first node information.

18 Claims, 13 Drawing Sheets

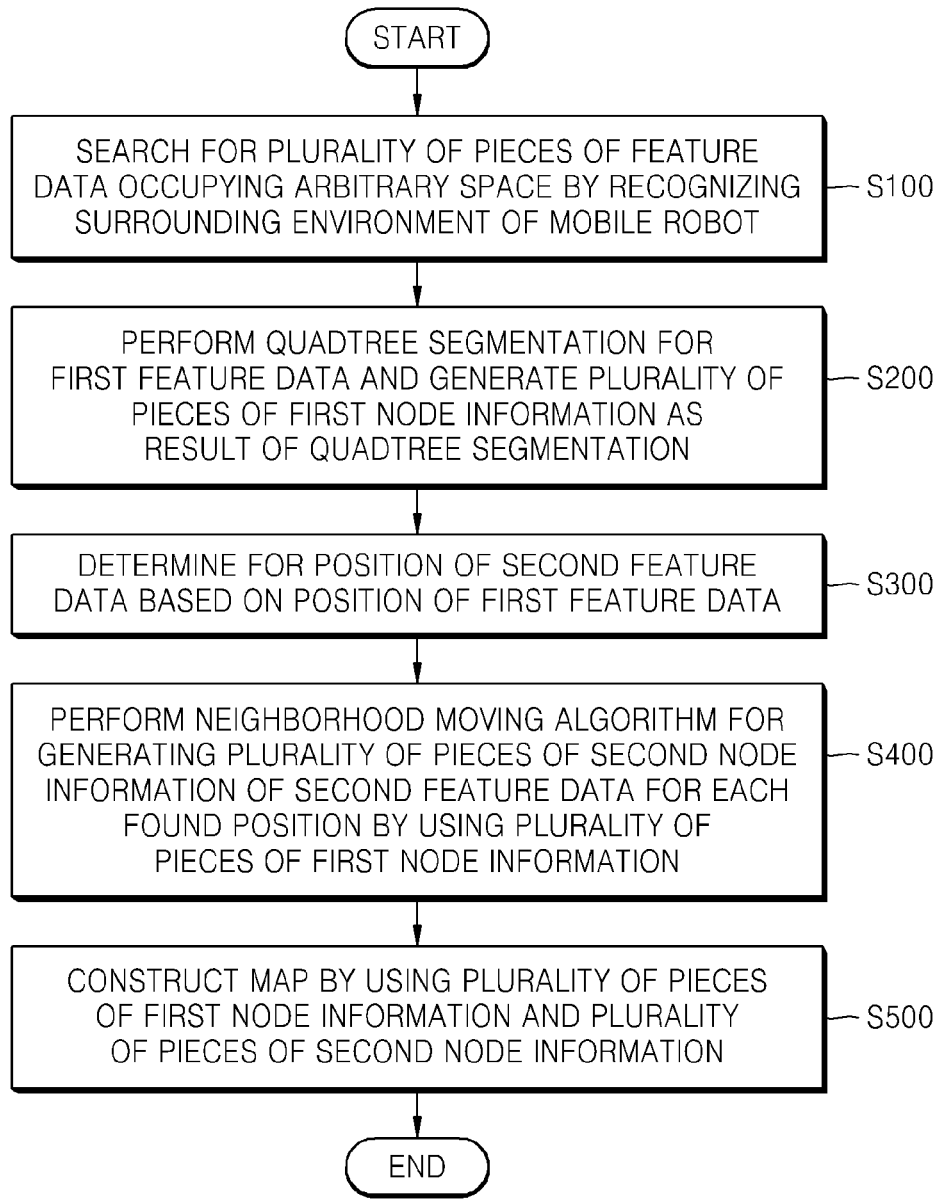

METHOD AND APPARATUS FOR CONSTRUCTING MAP FOR MOBILE ROBOT

CROSS-REFERENCE TO RELATED PATENT APPLICATION

This application claims priority from Korean Patent Application No. 10-2013-0051497 filed on May 7, 2013, in the Korean Intellectual Property Office, the disclosure of which is incorporated herein by reference in its entirety.

BACKGROUND

1. Field

Apparatuses and methods consistent with exemplary embodiments relate to constructing a map for a mobile robot to reduce a data amount and to increase an approach speed.

2. Description of the Related Art

A mobile robot should not only perceive a self-position in a given environment but should also construct a map of a surrounding environment when entering into a new environment that has not been previously explored. Constructing a map for a mobile robot involves a task of identifying a position of a nearby obstacle or object, an open space through which the mobile robot can freely move, and the like, and recording information obtained by the identification in an appropriate method.

Methods of constructing a map for a mobile robot may be largely classified into a two-dimensional (2D) grid-based environment map constructing method and a quadtree-based environment map constructing method. The grid-based environment map constructing method allows a robot to segment a surrounding environment into 2D grids and to record whether an obstacle exists in an arbitrary grid at a current position of the robot. However, the grid-based environment map constructing method has a problem in that a large memory capacity is required since a data amount increases as a traveling distance of a mobile robot increases or a size of a space to be moved increases. On the contrary, since the quadtree-based environment map constructing method assigns information to nodes by segmenting an area in which an obstacle exists into minute areas but displays only information on a node representing one large space for an area in which no obstacle exists, a memory can be efficiently used. However, since the quadtree-based environment map constructing method does not have space index information, a long approach time is required to approach an arbitrary node, and it is complicated to search for a position of stored data, and thus, the quadtree-based environment map constructing method is inappropriate for path planning.

SUMMARY

One or more exemplary embodiments provide methods and apparatuses for constructing a map for a mobile robot to reduce a data amount and increase an approach speed so that the mobile robot is operable in a wide area.

According to an aspect of an exemplary embodiment, there is provided a method of constructing a map for a mobile robot, the method including: searching for a plurality of feature data occupying an arbitrary space by scanning a surrounding environment of the mobile robot; performing quadtree segmentation on first feature data of the plurality of feature data to generate a plurality of first node information; determining a position of second feature data of the plurality of feature data with respect to the first feature data; and performing a neighborhood moving algorithm for generating a plurality of second node information of the second feature data according to the position of second feature data by using the plurality of first node information.

The determining a position may include determining the second feature data being in one of a first position, a second position, a third position and a fourth position, wherein the first, second, third and fourth positions are located orthogonally from one another.

The performing the neighborhood moving algorithm may include performing one of a first neighborhood moving algorithm, a second neighborhood moving algorithm, a third neighborhood moving algorithm and a fourth neighborhood moving algorithm for generating the plurality of second node information of the second feature data according to the determined position of the second feature data.

The performing the one of the first, second, third and fourth neighborhood moving algorithm includes performing the first neighborhood moving algorithm for generating the plurality of second node information of the second feature data in response to the determined position being the first position; performing the second neighborhood moving algorithm for generating the plurality of second node information of the second feature data in response to the determined position being the second position; performing the third neighborhood moving algorithm for generating the plurality of second node information of the second feature data in response to the determined position being the third position; and performing the fourth neighborhood moving algorithm for generating the plurality of second node information of the second feature data in response to the determined position being the fourth position.

The performing the one of the first, second, third and fourth neighborhood moving algorithm may include determining whether a bottom node in the plurality of first node information of the first feature data comprises a determining direction opposite from a direction extending from the first feature data to the determined position of the second feature data.

The performing the one of the first, second, third and fourth neighborhood moving algorithm may further include generating a first plurality of second node information of the second feature data in response to the bottom node in the plurality of first node information of the first feature data having the determining direction.

The performing the one of the first, second, third and fourth neighborhood moving algorithm may further include generating a second plurality of second node information of the second feature data in response to the bottom node in the plurality of first node information of the first feature data having the direction from the first feature data to the determined position of the second feature data.

The generating the first plurality of second node information of the second feature data may include: changing the determining direction of the bottom node in the plurality of first node information of the first feature data to the direction from the first feature data to the determined position of the second feature data; and generating the plurality of second node information of the second feature data as a result of combining the changed bottom node of the first node information and remaining nodes of the first node information.

The generating the second plurality of second node information of the second feature data may include: changing the direction from the first feature data to the determined position of the second feature data of the bottom node in the plurality of first node information of the first feature data to the determining direction and moving to a parent node of the bottom node; changing the determining direction to the direction from the first feature data to the determined position of the second feature data in the parent node; and generating the plurality of second node information of the second feature data as a result of combining the changed bottom node and the changed parent node of the first node information, and remaining nodes of the first node information.

According to an aspect of another exemplary embodiment, there is provided an apparatus for constructing a map for a mobile robot, the apparatus including: an environment recognition unit configured to search for a plurality of feature data occupying an arbitrary space by scanning a surrounding environment of the mobile robot; a quadtree information generation unit configured to perform quadtree segmentation on first feature data of the plurality of feature data to generate a plurality of first node information; a search unit configured to determine a position of second feature data of the plurality of feature data with respect to the first feature data; and a neighborhood moving information generation unit configured to perform a neighborhood moving algorithm for generating a plurality of second node information of the second feature data according to the position of second feature data by using the plurality of first node information.

The search unit may determine the second feature data being in one of a first position, second position, a third position and a fourth position, wherein the first, second, third and fourth positions may be located orthogonally from one another.

The neighborhood moving information generation unit may perform one of a first neighborhood moving algorithm, a second neighborhood moving algorithm, a third neighborhood moving algorithm and a fourth neighborhood moving algorithm for generating the plurality of second node information of the second feature data according to the position of the second feature data.

The neighborhood moving information generation unit may perform the first neighborhood moving algorithm for generating the plurality of second node information of the second feature data in response to the determined position being the first position, may perform the second neighborhood moving algorithm for generating the plurality of second node information of the second feature data in response to the determined position being the second position, may perform the third neighborhood moving algorithm for generating the plurality of second node information of the second feature data in response to the determined position being the third position, and may perform the fourth neighborhood moving algorithm for generating the plurality of second node information of the second feature data in response to the determined position being the fourth position.

The neighborhood moving information generation unit may determine whether a bottom node in the plurality of first node information of the first feature data comprises a determining direction opposite from a direction extending from the first feature data to the determined position of the second feature data.

The neighborhood moving information generation unit may generate a first plurality of second node information of the second feature data in response to the bottom node in the plurality of first node information of the first feature data having the determining direction.

The neighborhood moving information generation unit may generate a second plurality of second node information of the second feature data in response to the bottom node in the plurality of first node information of the first feature data having the direction from the first feature data to the determined position of the second feature data.

The neighborhood moving information generation unit may change the determining direction of a bottom node in the plurality of first node information of the first feature data to the direction from the first feature data to the determined position of the second feature data and may generate the first plurality of second node information of the second feature data as a result of combining the changed bottom node of the first node information and remaining nodes of first node information.

The neighborhood moving information generation unit may change the direction from the first feature data to the determined position of the second feature data of the bottom node in the plurality of first node information of the first feature data to the determining direction, may move to a parent node of the bottom node, may change the determining direction to the direction from the first feature data to the determined position of the second feature data, and may generate the second plurality of second node information of the second feature data as a result of combining the changed bottom node and the changed parent node of the first node information, and the remaining nodes of the first node information.

BRIEF DESCRIPTION OF THE DRAWINGS

The above and/or other features and advantages of the disclosure will become more apparent by describing in detail exemplary embodiments thereof with reference to the attached drawings in which:

FIG. 9 is a flowchart illustrating a method of constructing a map for a mobile robot, according to an exemplary embodiment;

DETAILED DESCRIPTION

Figure 1:
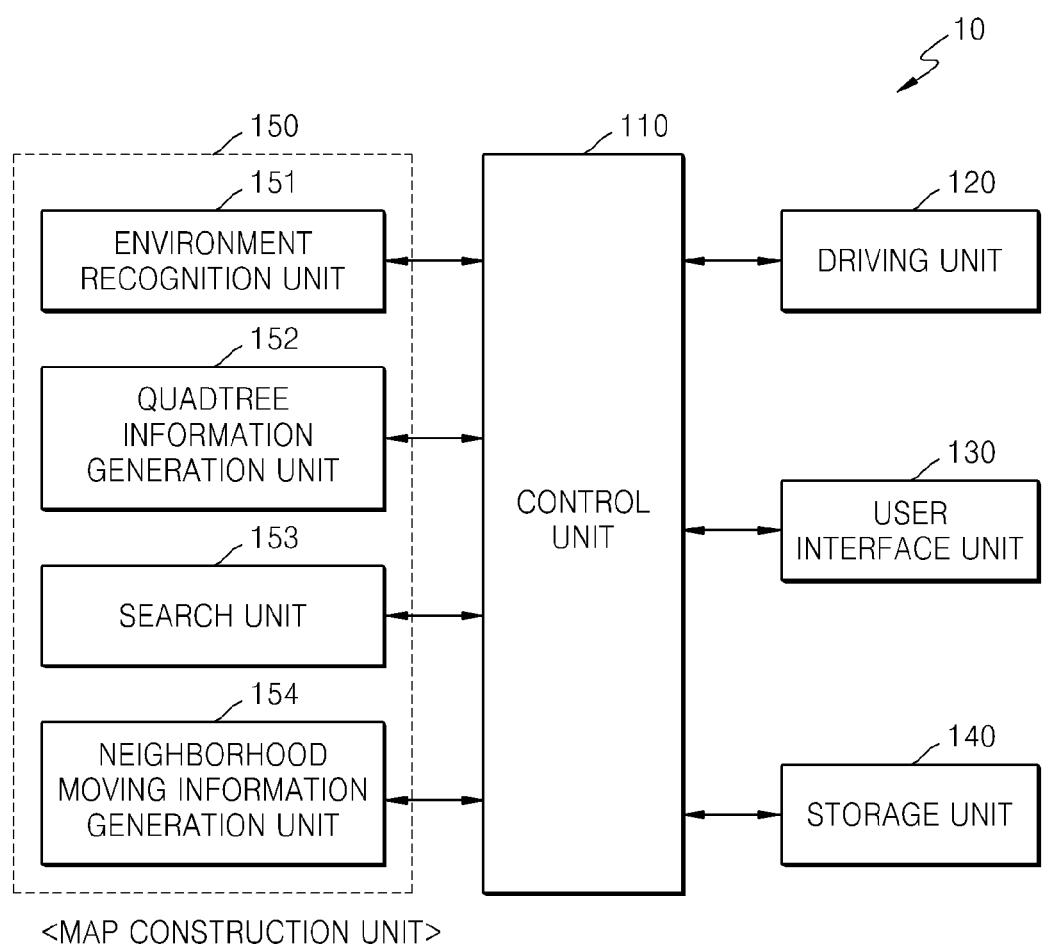
FIG. 1 is a block diagram of an apparatus for constructing a map for a mobile robot, according to an exemplary embodiment.

As used herein, the term "and/or" includes any and all combinations of one or more of the associated listed items.

The present inventive concepts may allow various kinds of change or modification and have several embodiments, and specific exemplary embodiments will be illustrated in drawings and described in detail in the following detailed description. However, it should be understood that the specific embodiments do not limit the present inventive concepts to a specific disclosing form but include every modified, equivalent, or replaced one within the spirit and technical scope of the present inventive concepts. In the following description, well-known technology is not described in detail so as not to obscure the exemplary embodiments with unnecessary detail.

Although terms, such as 'first' and 'second', can be used to describe various elements, the elements cannot be limited by the terms. The terms can be used to classify a certain element from another element.

The terminology used in the application is used only to describe the specific exemplary embodiments and does not have any intention to limit the present inventive concepts. An expression in the singular includes an expression in the plural unless they are clearly different from each other in context. In the application, it should be understood that terms, such as 'include' and 'have', are used to indicate the existence of an implemented feature, number, step, operation, element, part, or a combination thereof without excluding in advance the possibility of the existence or addition of one or more other features, numbers, steps, operations, elements, parts, or combinations thereof.

The present inventive concepts may be represented with functional blocks and various processing steps. These functional blocks may be implemented by various numbers of hardware and/or software configurations for executing specific functions. For example, the exemplary embodiments may adopt direct circuit configurations, such as memory, processing, logic, and look-up tables, for executing various functions under control of one or more processors or by other control devices. Like the components of the exemplary embodiments being able to execute the various functions with software programming or software elements, the exemplary embodiments may be implemented by a programming or scripting language, such as C, C++, Java, or assembler, with various algorithms implemented by a combination of a data structure, processes, routines, and/or other programming components. Functional aspects may be implemented with algorithms executed in one or more processors. In addition, the exemplary embodiments may adopt the prior art for electronic environment setup, signal processing and/or data processing. The terms, such as "mechanism", "element", "means", and "configuration", may be widely used and are not delimited as mechanical and physical configurations. The terms may include the meaning of a series of routines of software in association with a processor.

The term "feature data" used in this specification indicates an obstacle occupying an arbitrary space, which is recognized by a mobile robot through environment recognition (sensor scanning or captured images) with respect to the arbitrary space, and the feature data may include position information or address information indicating a position of the obstacle. In addition, "first feature data" used in this specification indicates arbitrary feature data found by the mobile robot and may include, for example, feature data found by the mobile robot for the first time. In addition, "second feature data" may include feature data found by the mobile robot after finding the first feature data.

In the specification, "first direction" may indicate east, "second direction" may indicate west, "third direction" may indicate south, and "fourth direction" may indicate north.

Exemplary embodiments will now be described in detail with reference to the accompanying drawings. Like reference numerals in the drawings denote like elements, and thus descriptions thereof will not be repeated.

FIG. 1 is a block diagram of an apparatus 10 for constructing a map for a mobile robot 100 (shown in FIG. 2) according to an exemplary embodiment.

Referring to FIG. 1, the apparatus 10 is included in the mobile robot 100 and may include a control unit 110, a driving unit 120, a user interface unit 130, a storage unit 140, and a map construction unit 150.

The control unit 110 includes a microprocessor (not shown) and controls a general operation of the apparatus 10. The control unit 110 controls movement of the mobile robot 100 in an arbitrary direction within an arbitrary space $S_a$ through position recognition of the mobile robot 100 equipped with the apparatus 10, controls map construction by collecting data generated according to the movement of the mobile robot 100, and controls writing (storing) all generated data in or reading from the storage unit 140.

The driving unit 120 includes, for example, a driving motor (not shown) and moves the mobile robot 100 equipped with the apparatus 10. In detail, the driving unit 120 moves the mobile robot 100 within an arbitrary space $S_a$ according to a control signal received from the control unit 110.

Figure 2:
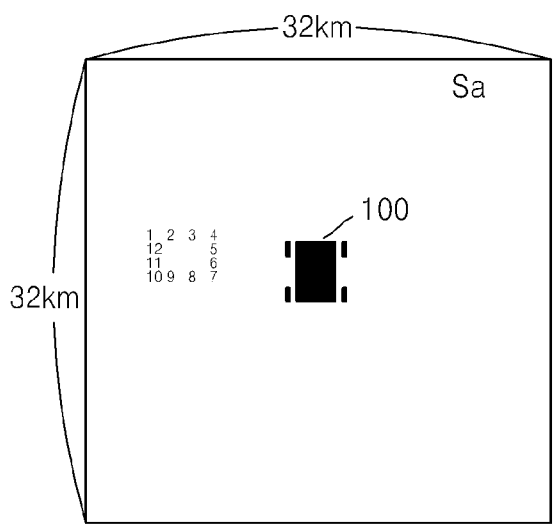
FIG. 2 illustrates a plurality of pieces of feature data acquired as a result of environment recognition of the mobile robot of FIG. 1.
Figure 3:
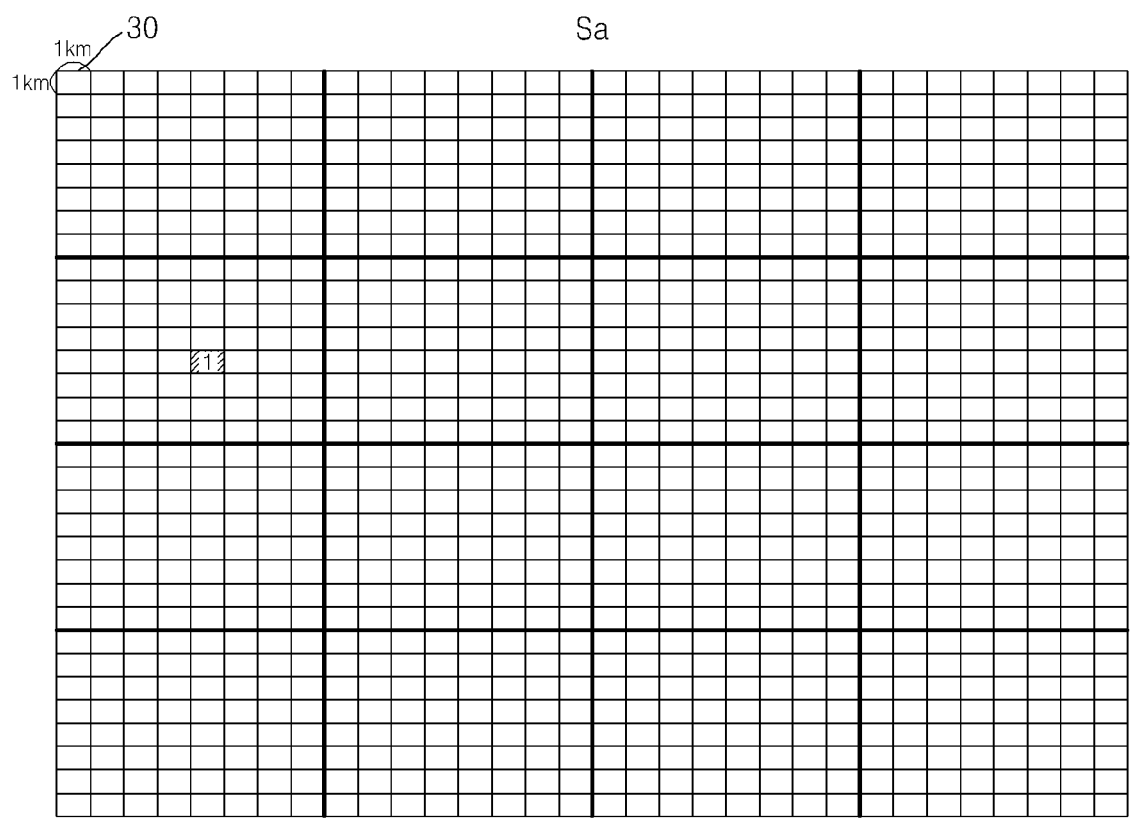
FIG. 3 illustrates a set map area according to an exemplary embodiment.

The user interface unit 130 may receive coordinates of a start point and a target point so that the mobile robot 100 moves, and the user interface unit 130 may also receive a switch manipulation signal or a voice signal for a user to input a work command into the mobile robot 100. Furthermore, the user interface unit 130 may set a size of a map to be constructed by the mobile robot 100. The map may be a scale map in which an actual traveling area of the mobile robot 100 is reduced according to a predetermined ratio, and a size of the map may be set through the user interface unit 130. FIG. 2 illustrates a plurality of pieces of feature data as an environment recognition result acquired by the mobile robot 100 while traveling in an arbitrary space $S_a$ (for example, 32 km long and 32 km wide). FIG. 3 illustrates a set map area showing an actual traveled space of the mobile robot 100, wherein a size of each cell 30 is set to 1 km long by 1 km wide.

The map construction unit 150 searches for a plurality of pieces of feature data by scanning a surrounding environment of the mobile robot 100 and constructs a map using position information generated by performing quadtree segmentation and a neighborhood moving algorithm on the found feature data.

In the current exemplary embodiment, the map construction unit 150 may include an environment recognition unit 151, a quadtree information generation unit 152, a search unit 153, and a neighborhood moving information generation unit 154.

The environment recognition unit 151 collects a plurality of pieces of feature data searched for by scanning, also known as performing environment recognition, an arbitrary space $S_a$ by the mobile robot 100 using a distance measurement sensor (not shown) including, for example, an ultrasound sensor, an infrared sensor, a laser sensor, or the like under control of the control unit 110. Furthermore, the environment recognition unit 151 collects a plurality of pieces of feature data searched for in an image captured using an image capturing unit (not shown) including, for example, a camera, a stereo camera, or the like. FIG. 2 illustrates a plurality of pieces of feature data, denoted as numerals 1 through 12, as an environment recognition result obtained by the mobile robot 100 while traveling in the arbitrary space $S_a$, and the mobile robot 100 may detect an approximate position of the plurality of pieces of feature data searched for through the environment recognition.

The quadtree information generation unit 152 generates a plurality of pieces of first node information by performing quadtree segmentation for first feature data among the plurality of pieces of feature data found by the mobile robot 100. For example, if the first feature data is "1" in FIG. 2, when the quadtree segmentation is performed for the first feature data, the first feature data may be shown as in FIG. 3.

As a result of the quadtree segmentation, node information is generated in all child nodes including the first feature data except for a top node, also known as ROOT, and each node information includes any one of a first direction (east: E) and a second direction (west: W) and any one of a third direction (south: S) and a fourth direction (north: N). Hereinafter, for convenience of description, the first direction is indicated by E, the second direction is indicated by W, the third direction is indicated by S, and the fourth direction is indicated by N.

Figure 4A:
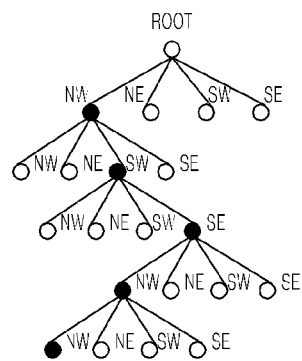
FIGS. 4A and 4B illustrate quadtree segmentation of first feature data of FIG. 1 and generation of first node information according to an exemplary embodiment.
Figure 4B:
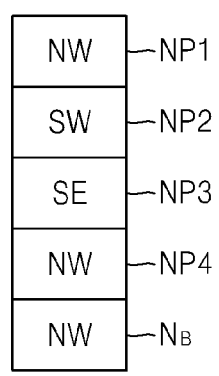

The quadtree segmentation of the first feature data "1" shown in FIG. 3 will now be described. The quadtree information generation unit 152 starts from a top node (ROOT) with the entire map area set as in FIG. 3 and segments the entire map area into four spaces NW, NE, SW, and SE as a first parent node NP1, wherein the first feature data is located in the space NW of the first parent node NP1. Next, the quadtree information generation unit 152 segments the space NW of the first parent node NP1 into four spaces NW, NE, SW, and SE as a second parent node NP2, wherein the first feature data is located in the space SW of the second parent node NP2. Next, the quadtree information generation unit 152 segments the space SW of the second parent node NP2 into four spaces NW, NE, SW, and SE as a third parent node NP3, wherein the first feature data is located in the space SE of the third parent node NP3. Next, the quadtree information generation unit 152 segments the space SE of the third parent node NP3 into four spaces NW, NE, SW, and SE as a fourth parent node NP4, wherein the first feature data is located in the space NW of the fourth parent node NP4. Next, the quadtree information generation unit 152 segments the space NW of the fourth parent node NP4 into four spaces NW, NE, SW, and SE, wherein the first feature data is located in the space NW that indicates a bottom node. As described above, the plurality of pieces of first node information generated as a result of the quadtree segmentation of the first feature data are ROOT, NW, SW, SE, NW, and NW. FIG. 4A shows the quadtree segmentation of the first feature data, and FIG. 4B shows the plurality of pieces of first node information of the first feature data, which are stored in the storage unit 140.

The search unit 153 determines a position of second feature data with respect to a position of the first feature data. The search unit 153 may determine the position of the second feature data that is closest to the first feature data or the second feature data that is sequentially found next to the first feature data from among the plurality of pieces of feature data found by the mobile robot 100 in FIG. 2. The search unit 153 may determine the position of the second feature data as one of first to fourth positions with respect to the position of the first feature data. Here, the position determination with respect to the first feature data is important since an operation of a neighborhood moving algorithm to be described below varies according to the position of the second feature data with respect to the first feature data that is determined by the search unit 153.

In the current exemplary embodiment, for convenience of description, the plurality of pieces of feature data are described in an order shown in FIG. 2. Referring to FIG. 2, the second feature data is "2", third feature data is "3", and so on, and twelfth feature data is "12". As shown in FIG. 2, the second feature data, the third feature data, and fourth feature data are located at the first position, i.e. on the right, with respect to the first feature data. Fifth feature data, sixth feature data, and seventh feature data are located at the third position, i.e. on the bottom, with respect to the fourth feature data. Eighth feature data, ninth feature data, and tenth feature data are located at the second position, i.e. on the left, with respect to the seventh feature data, and eleventh feature data and the twelfth feature data are located at the fourth position, i.e. on the top, with respect to the tenth feature data.

The neighborhood moving information generation unit 154 generates a plurality of pieces of second node information of the second feature data by performing a different neighborhood moving algorithm for each position of the second feature data, which is determined by the search unit 153, based on the plurality of pieces of first node information of the first feature data.

The neighborhood moving algorithm is an algorithm for generating the plurality of pieces of second node information of the second feature data based on the plurality of pieces of first node information of the first feature data. In the related art, since the same quadtree segmentation as performed on the first feature data is required to be performed again to generate the plurality of pieces of second node information of the second feature data, a long approach time is required, and the position determination is complicated. However, by performing the neighborhood moving algorithm according to the current exemplary embodiment, the disadvantages described above can be resolved.

In addition, the neighborhood moving algorithm according to the current exemplary embodiment may be classified into first to fourth neighborhood moving algorithms. The first neighborhood moving algorithm is performed in response to the second feature data being located at the first position, i.e. on the right, with respect to the determination result of the search unit 153, the second neighborhood moving algorithm is performed in response to the second feature data being located at the second position, i.e. on the left, with respect to the determination result of the search unit 153, the third neighborhood moving algorithm is performed in response to the second feature data being located at the third position, i.e. on the bottom, with respect to the determination result of the search unit 153, the fourth neighborhood moving algorithm is performed in response to the second feature data being located at the fourth position, i.e. on the top, with respect to the determination result of the search unit 153.

A process of generating the plurality of pieces of second node information of the second feature data by performing the first and second neighborhood moving algorithms in the neighborhood moving information generation unit 154 will now be described.

Figure 5A:
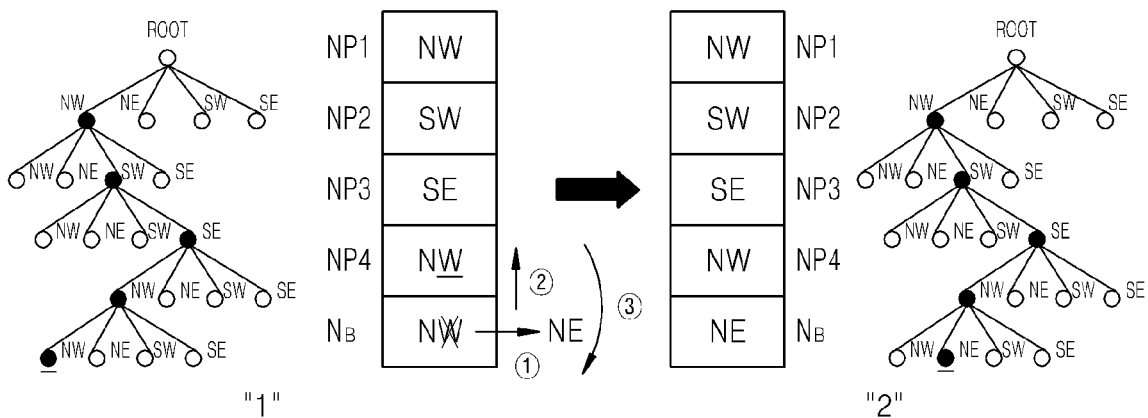
FIGS. 5A to 8B illustrate generation of first neighborhood moving information, second neighborhood moving information, third neighborhood moving information, and fourth neighborhood moving information of FIG. 1 according to an exemplary embodiment.
Figure 5B:
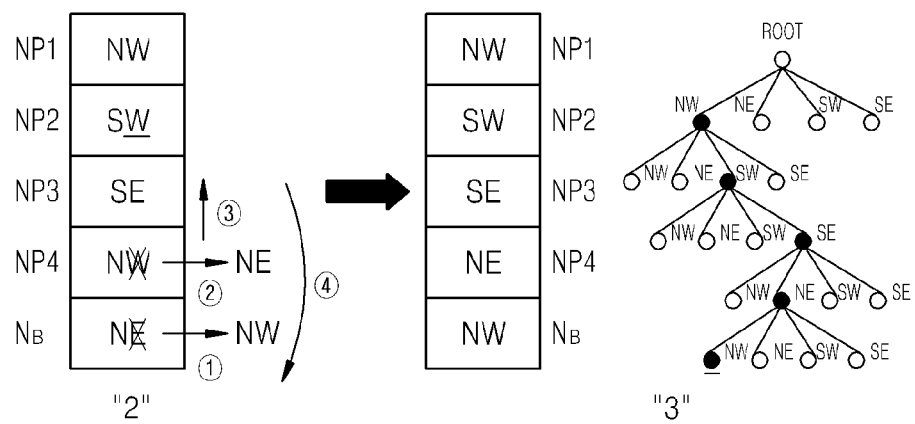
Figure 5C:
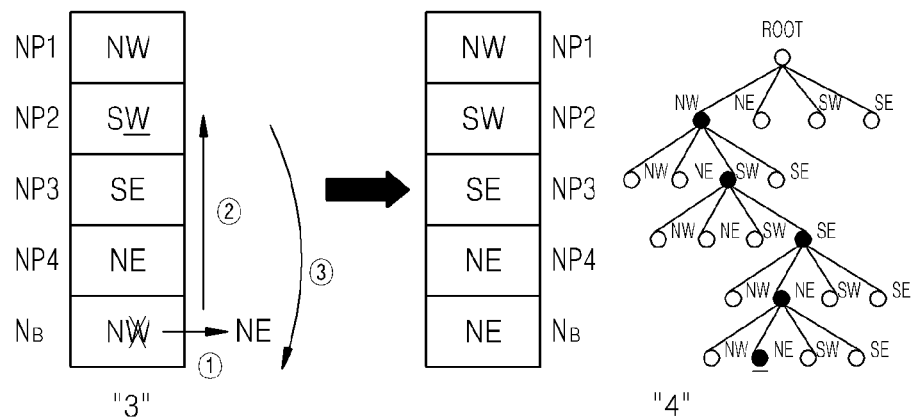

First, a process of performing the first neighborhood moving algorithm in the neighborhood moving information generation unit 154 will now be described with reference to FIGS. 5A through 5C.

The neighborhood moving information generation unit 154 determines whether a bottom node $N_B$ in the plurality of pieces of first node information of the first feature data "1" includes W. Referring to FIG. 5A, since the bottom node $N_B$ of the first feature data "1" is indicated by NW, the bottom node $N_B$ of the first feature data "1" includes W. In this case, the neighborhood moving information generation unit 154 changes W in the bottom node $N_B$ to E (①) and moves to parent nodes until a node including W is found (②). In FIG. 5A, since a fourth parent node NP4 is indicated by NW and includes W, the neighborhood moving information generation unit 154 moves from the bottom node $N_B$ to the fourth parent node NP4, ends the first neighborhood moving algorithm, and generates the plurality of pieces of second node information of the second feature data "2" as a result of combining the existing node information of the top node ROOT to the fourth parent node NP4 and the changed bottom node $N_B$ information (③). Thus, the generated pieces of second node information of the second feature data "2" are ROOT, NW, SW, SE, NW, and NE. If the neighborhood moving information generation unit 154 cannot find node information including W even though moving through parent nodes, that is, if W is not included in any of the fourth parent node NP4 to the top node ROOT, the search is finished by setting a result of searching from a current node (top node ROOT) to the changed bottom node $N_B$ as the plurality of pieces of second node information. Since the nodes (the fourth parent node NP4 to the top node ROOT) remaining by excluding the changed bottom node $N_B$ are already generated, the search for the plurality of pieces of second node information is quickly achieved, thereby taking less time than quadtree segmentation of the related art.

When the generation of the plurality of pieces of second node information of the second feature data "2" is completed, the second feature data "2" becomes first feature data, and a plurality of pieces of second node information of second feature data "3" located at the first position, i.e. on the right, with respect to the first feature data "2" are generated. The neighborhood moving information generation unit 154 determines whether a bottom node $N_B$ in the plurality of pieces of first node information of the first feature data "2" includes W, and if the bottom node $N_B$ of the first feature data "2" does not include W, the neighborhood moving information generation unit 154 determines whether the bottom node $N_B$ of the first feature data "2" includes E. Referring to FIG. 5B, since bottom node information of the first feature data "2" is NE, the bottom node $N_B$ of the first feature data "2" includes E. In this case, the neighborhood moving information generation unit 154 changes E in the bottom node $N_B$ to W and moves to a parent node (①). Thereafter, the neighborhood moving information generation unit 154 determines whether the parent node includes W. If the parent node includes W, the neighborhood moving information generation unit 154 changes W to E (②). Thereafter, the neighborhood moving information generation unit 154 moves to parent nodes until a node including W is found (③). In FIG. 5B, since a second parent node NP2 is indicated by SW and includes W, the neighborhood moving information generation unit 154 moves from the bottom node $N_B$ to the second parent node NP2. Thereafter, the neighborhood moving information generation unit 154 ends the first neighborhood moving algorithm and generates the plurality of pieces of second node information of second feature data "3" as a result of combining the existing node information of the top node ROOT to the third parent node NP3, the changed fourth parent node information (②), and the changed bottom node information (④). Thus, the generated pieces of second node information of the second feature data "3" are ROOT, NW, SW, SE, NE, and NW. If the neighborhood moving information generation unit 154 cannot find node information including W even though moving to parent nodes, that is, if W is not included in any of the third parent node NP3 to the top node, the search is finished by setting a result of searching from the current node (top node ROOT) to the changed nodes (the bottom node $N_B$ and the fourth parent node NP4) as the plurality of pieces of second node information. Since the nodes (the third parent node NP3 to the top node ROOT) remaining by excluding the changed bottom node $N_B$ and the changed fourth parent node NP4 are already generated, the search for the plurality of pieces of second node information is quickly achieved, thereby taking less time than the quadtree segmentation of the related art.

When the generation of the plurality of pieces of second node information of the second feature data "3" is completed, the second feature data "3" becomes first feature data, and a plurality of pieces of second node information of second feature data "4" located at the first position, i.e. on the right, with respect to the first feature data "3" are generated. The neighborhood moving information generation unit 154 determines whether a bottom node $N_B$ in the plurality of pieces of first node information of the first feature data "3" includes W. Referring to FIG. 5C, since the bottom node information of the first feature data "3" is NW, the bottom node $N_B$ of the first feature data "3" includes W. In this case, the neighborhood moving information generation unit 154 changes W in the bottom node $N_B$ to E (①) and moves to parent nodes until a node including W is found (②). In FIG. 5C, since a second parent node NP2 is indicated by SW and includes W, the neighborhood moving information generation unit 154 moves from the bottom node $N_B$ to the second parent node, ends the first neighborhood moving algorithm, and generates the plurality of pieces of second node information of the second feature data "4" as a result of combining the existing node information of the top node ROOT to the fourth parent node NP4 and the changed bottom node information (③). Thus, the generated pieces of second node information of the second feature data "4" are ROOT, NW, SW, SE, NE, and NE. If the neighborhood moving information generation unit 154 cannot find node information including W even though moving to parent nodes, that is, if W is not included in any of the fourth parent node NP4 to the top node ROOT, the search is finished by setting a result of searching from a current node (top node ROOT) to the changed bottom node as the plurality of pieces of second node information. Since the nodes (the fourth parent node NP4 to the top node ROOT) remaining by excluding the changed bottom node are already generated, the search for the plurality of pieces of second node information is quickly achieved, thereby taking less time than quadtree segmentation of the related art.

As described above, the first neighborhood moving algorithm can be separately performed for a case where a bottom node $N_B$ in a plurality of pieces of first node information of first feature data includes W and a case where the bottom node includes E. When the bottom node includes W, a plurality of pieces of second node information of second feature data are generated by only changing W in the bottom node to E. Meanwhile, when the bottom node includes E, a plurality of pieces of second node information of second feature data are generated by changing E in the bottom node to W, moving to a parent node, and changing W in the parent node to E.

Figure 6A:
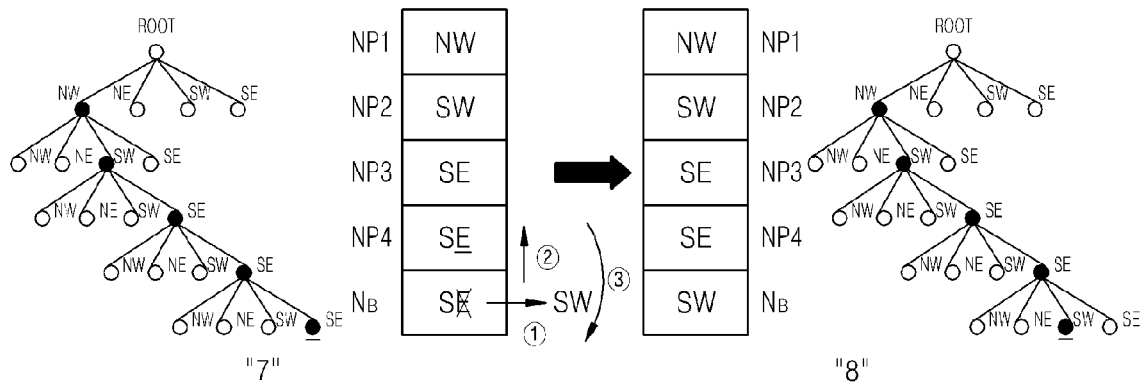
Figure 6B:
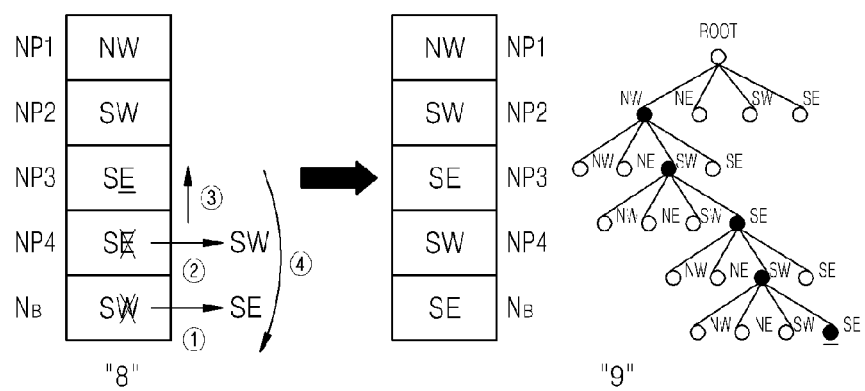
Figure 6C:
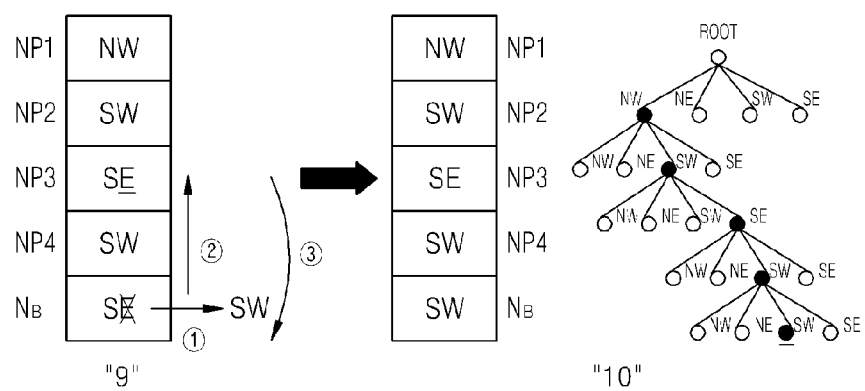

Next, a process of performing the second neighborhood moving algorithm in the neighborhood moving information generation unit 154 will now be described with reference to FIGS. 6A through 6C.

The neighborhood moving information generation unit 154 determines whether a bottom node $N_B$ includes E in a plurality of pieces of first node information of the first feature data "7". Referring to FIG. 6A, since bottom node information of the first feature data "7" is SE, a bottom node of the first feature data "7" includes E. In this case, the neighborhood moving information generation unit 154 changes E in the bottom node $N_B$ to W (①) and moves to parent nodes until a node including E is found (②). In FIG. 6A, since a fourth parent node NP4 is indicated by SE and includes E, the neighborhood moving information generation unit 154 moves from the bottom node $N_B$ to the fourth parent node NP4, ends the second neighborhood moving algorithm, and generates a plurality of pieces of second node information of the second feature data "8" as a result of combining the existing node information of the top node ROOT to the fourth parent node NP4 and the changed bottom node information (③). Thus, the generated pieces of second node information of the second feature data "8" are ROOT, NW, SW, SE, SE, and SW. If the neighborhood moving information generation unit 154 cannot find node information including E even though moving to parent nodes, that is, if E is not included in any of the fourth parent node NP4 to the top node ROOT, the search is finished by setting a result of searching from a current node (top node ROOT) to the changed bottom node $N_B$ as the plurality of pieces of second node information. Since the nodes (the fourth parent node NP4 to the top node ROOT) remaining by excluding the changed bottom node $N_B$ are already generated, the search for the plurality of pieces of second node information is quickly achieved, thereby taking less time than quadtree segmentation of the related art.

When the generation of the plurality of pieces of second node information of the second feature data "8" is completed, the second feature data "8" becomes first feature data, and a plurality of pieces of second node information of second feature data "9" located at the second position, i.e. on the left, with respect to the first feature data "8" are generated. The neighborhood moving information generation unit 154 determines whether a bottom node $N_B$ in the plurality of pieces of first node information of the first feature data "8" includes E, and if the bottom node $N_B$ of the first feature data "8" does not include E, the neighborhood moving information generation unit 154 determines whether the bottom node $N_B$ of the first feature data "8" includes W. Referring to FIG. 6B, since bottom node information of the first feature data "8" is SW, the bottom node $N_B$ of the first feature data "8" includes W. In this case, the neighborhood moving information generation unit 154 changes W in the bottom node $N_B$ to E and moves to a parent node (①). Thereafter, the neighborhood moving information generation unit 154 determines whether the parent node includes E. If the parent node includes E, the neighborhood moving information generation unit 154 changes E to W (②). Thereafter, the neighborhood moving information generation unit 154 moves to parent nodes until a node including E is found (③). In FIG. 6B, since a third parent node NP3 is indicated by SE and includes E, the neighborhood moving information generation unit 154 moves from the bottom node $N_B$ to the third parent node NP3. Thereafter, the neighborhood moving information generation unit 154 ends the second neighborhood moving algorithm and generates the plurality of pieces of second node information of second feature data "9" as a result of combining the existing node information of the top node ROOT to the third parent node NP3, the changed fourth parent node information (②), and the changed bottom node information (④). Thus, the generated pieces of second node information of the second feature data "9" are ROOT, NW, SW, SE, SW, and SE. If the neighborhood moving information generation unit 154 cannot find node information including E even though moving to parent nodes, that is, if E is not included in any of the third parent node NP3 to the top node ROOT, the search is finished by setting a result of searching from the current node (top node ROOT) to the changed nodes (the bottom node $N_B$ and the fourth parent node NP4) as the plurality of pieces of second node information. Since the nodes (the third parent node NP3 to the top node ROOT) remaining by excluding the changed bottom node $N_B$ and the changed fourth parent node are already generated, the search for the plurality of pieces of second node information is quickly achieved, thereby taking less time than the quadtree segmentation of the related art.

When the generation of the plurality of pieces of second node information of the second feature data "9" is completed, the second feature data "9" becomes first feature data, and a plurality of pieces of second node information of second feature data "10" located at the second position, i.e. on the left, with respect to the first feature data "3" are generated. The neighborhood moving information generation unit 154 determines whether a bottom node $N_B$ in the plurality of pieces of first node information of the first feature data "9" includes E. Referring to FIG. 6C, since the bottom node information of the first feature data "9" is SE, the bottom node $N_B$ of the first feature data "9" includes E. In this case, the neighborhood moving information generation unit 154 changes E in the bottom node $N_B$ to W (①) and moves to parent nodes until a node including E is found (②). In FIG. 6C, since a third parent node NP3 is indicated by SE and includes E, the neighborhood moving information generation unit 154 moves from the bottom node $N_B$ to the third parent node, ends the second neighborhood moving algorithm, and generates a plurality of pieces of second node information of the second feature data "10" as a result of combining the existing node information of the top node ROOT to the fourth parent node and the changed bottom node information (③). Thus, the generated pieces of second node information of the second feature data "10" are ROOT, NW, SW, SE, SW, and SW. If the neighborhood moving information generation unit 154 cannot find node information including E even though moving to parent nodes, that is, if E is not included in any of the fourth parent node to the top node ROOT, the search is finished by setting a result of searching from a current node (top node ROOT) to the changed bottom node $N_B$ as the plurality of pieces of second node information. Since the nodes (the fourth parent node NP4 to the top node ROOT) remaining by excluding the changed bottom node $N_B$ are already generated, the search for the plurality of pieces of second node information is quickly achieved, thereby taking less time than quadtree segmentation of the related art.

As described above, the second neighborhood moving algorithm can be separately performed for a case where a bottom node $N_B$ in a plurality of pieces of first node information of first feature data includes E and a case where the bottom node includes W. When the bottom node $N_B$ includes E, a plurality of pieces of second node information of second feature data are generated by only changing E in the bottom node to W. Meanwhile, when the bottom node $N_B$ includes W, a plurality of pieces of second node information of second feature data are generated by changing W in the bottom node $N_B$ to E, moving to a parent node, and changing E in the parent node to W.

Figure 7A:
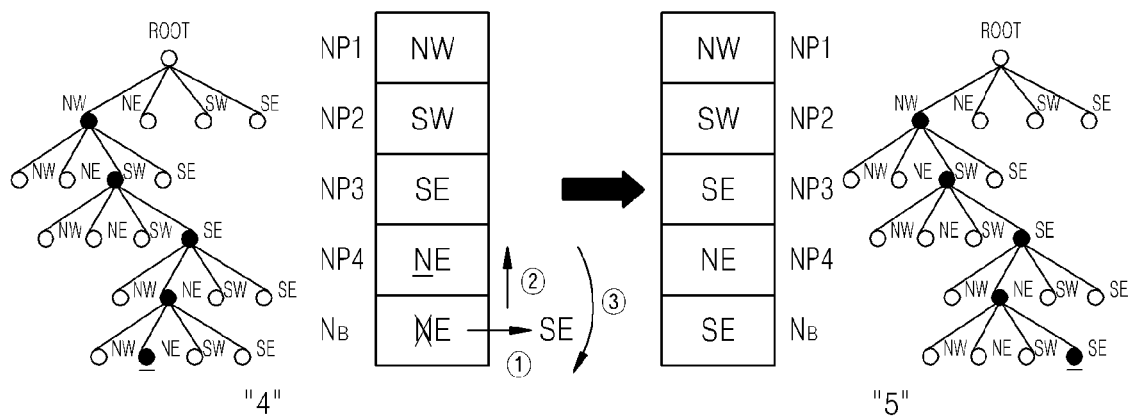
Figure 7B:
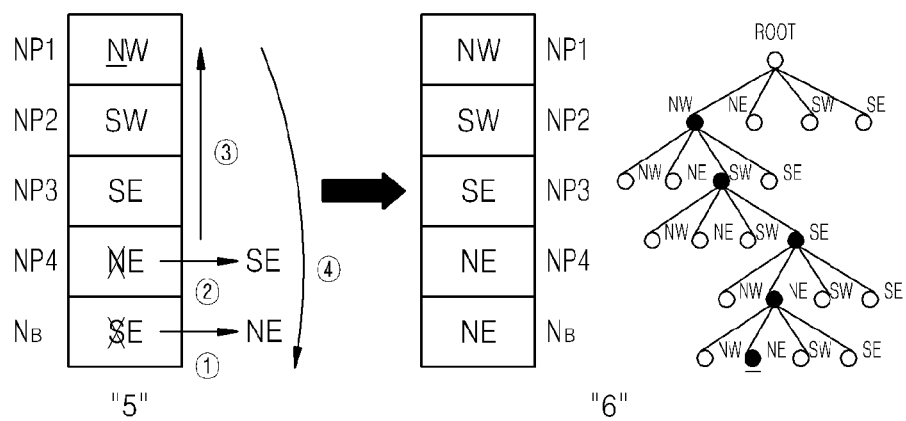
Figure 7C:
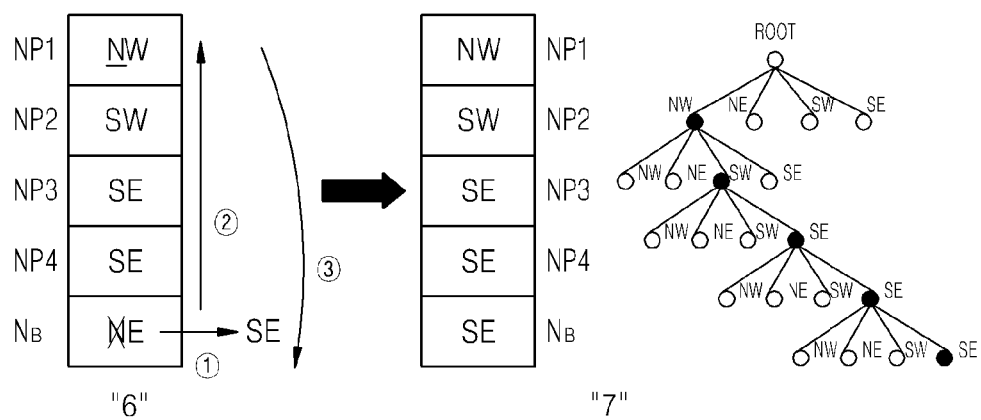

Next, a process of performing the third neighborhood moving algorithm in the neighborhood moving information generation unit 154 will now be described with reference to FIGS. 7A through 7C.

The neighborhood moving information generation unit 154 determines whether a bottom node $N_B$ in the plurality of pieces of first node information of the first feature data "4" includes N. Referring to FIG. 7A, since the bottom node information of the first feature data "4" is NE, a bottom node $N_B$ of the first feature data "4" includes N. In this case, the neighborhood moving information generation unit 154 changes N in the bottom node $N_B$ to S (①) and moves to parent nodes until a node including N is found (②). In FIG. 7A, since a fourth parent node NP4 is indicated by NE and includes N, the neighborhood moving information generation unit 154 moves from the bottom node $N_B$ to the fourth parent node NP4, ends the third neighborhood moving algorithm, and generates a plurality of pieces of second node information of the second feature data "5" as a result of combining the existing node information of the top node ROOT to the fourth parent node NP4 and the changed bottom node information (③). Thus, the generated pieces of second node information of the second feature data "5" are ROOT, NW, SW, SE, NE, and SE. If the neighborhood moving information generation unit 154 cannot find node information including N even though moving to parent nodes, that is, if N is not included in any of the fourth parent node NP4 to the top node ROOT, the search is finished by setting a result of searching from a current node (top node ROOT) to the changed bottom node as the plurality of pieces of second node information. Since the nodes (the fourth parent node NP4 to the top node ROOT) remaining by excluding the changed bottom node are already generated, the search for the plurality of pieces of second node information is quickly achieved, thereby taking less time than the conventional quadtree segmentation.

When the generation of the plurality of pieces of second node information of the second feature data "5" is completed, the second feature data "5" becomes first feature data, and a plurality of pieces of second node information of second feature data "6" located at the third position, i.e. on the bottom, with respect to the first feature data "5" are generated. The neighborhood moving information generation unit 154 determines whether a bottom node $N_B$ in the plurality of pieces of first node information of the first feature data "5" includes N, and if the bottom node $N_B$ of the first feature data "5" does not include N, the neighborhood moving information generation unit 154 determines whether the bottom node $N_B$ of the first feature data "5" includes S. Referring to FIG. 7B, since bottom node information of the first feature data "5" is SE, the bottom node $N_B$ of the first feature data "5" includes S. In this case, the neighborhood moving information generation unit 154 changes S in the bottom node $N_B$ to N and moves to a parent node (①). Thereafter, the neighborhood moving information generation unit 154 determines whether the parent node includes N. If the parent node includes N, the neighborhood moving information generation unit 154 changes N to S (②). Thereafter, the neighborhood moving information generation unit 154 moves to parent nodes until a node including N is found (③). In FIG. 7B, since a first parent node NP1 is indicated by NW and includes N, the neighborhood moving information generation unit 154 moves from the bottom node $N_B$ to the first parent node NP1. Thereafter, the neighborhood moving information generation unit 154 ends the third neighborhood moving algorithm and generates the plurality of pieces of second node information of second feature data "6" as a result of combining the existing node information of the top node ROOT to the third parent node NP3, the changed first parent node information (②), and the changed bottom node information (④). Thus, the generated pieces of second node information of the second feature data "6" are ROOT, NW, SW, SE, SE, and NE. If the neighborhood moving information generation unit 154 cannot find node information including N even though moving to parent nodes, that is, if N is not included in any of the second parent node to the top node, the search is finished by setting a result of searching from the current node (top node ROOT) to the changed nodes (the bottom node $N_B$ and the fourth parent node NP4) as the plurality of pieces of second node information. Since the nodes (the third parent node NP3 to the top node ROOT) remaining by excluding the changed bottom node $N_B$ and the changed fourth parent node NP4 are already generated, the search for the plurality of pieces of second node information is quickly achieved, thereby taking less time than quadtree segmentation of the related art.

When the generation of the plurality of pieces of second node information of the second feature data "6" is completed, the second feature data "6" becomes first feature data, and a plurality of pieces of second node information of second feature data "7" located at the third position, i.e. on the bottom, with respect to the first feature data "6" are generated. The neighborhood moving information generation unit 154 determines whether a bottom node $N_B$ in the plurality of pieces of first node information of the first feature data "6" includes N. Referring to FIG. 7C, since the bottom node information of the first feature data "6" is NE, the bottom node $N_B$ of the first feature data "6" includes N. In this case, the neighborhood moving information generation unit 154 changes N in the bottom node to S (①) and moves to parent nodes until a node including N is found (②). In FIG. 7C, since a first parent node NP1 is indicated by NW and includes N, the neighborhood moving information generation unit 154 moves from the bottom node $N_B$ to the first parent node, ends the third neighborhood moving algorithm, and generates a plurality of pieces of second node information of the second feature data "7" as a result of combining the existing node information of the top node ROOT to the fourth parent node NP4 and the changed bottom node information (③). Thus, the generated pieces of second node information of the second feature data "7" are ROOT, NW, SW, SE, SE, and SE. If the neighborhood moving information generation unit 154 cannot find node information including N even though moving to parent nodes, that is, if N is not included in any of the fourth parent node NP4 to the top node ROOT, the search is finished by setting a result of searching from a current node (top node ROOT) to the changed bottom node $N_B$ as the plurality of pieces of second node information. Since the nodes (the fourth parent node NP4 to the top node ROOT) remaining by excluding the changed bottom node $N_B$ are already generated, the search for the plurality of pieces of second node information is quickly achieved, thereby taking less time than the conventional quadtree segmentation.

As described above, the third neighborhood moving algorithm can be separately performed for a case where a bottom node $N_B$ in a plurality of pieces of first node information of first feature data includes N and a case where the bottom node $N_B$ includes S. When the bottom node $N_B$ includes N, a plurality of pieces of second node information of second feature data are generated by only changing N in the bottom node $N_B$ to S. Meanwhile, when the bottom node $N_B$ includes S, a plurality of pieces of second node information of second feature data are generated by changing S in the bottom node $N_B$ to N, moving to a parent node, and changing N in the parent node to S.

Figure 8A:
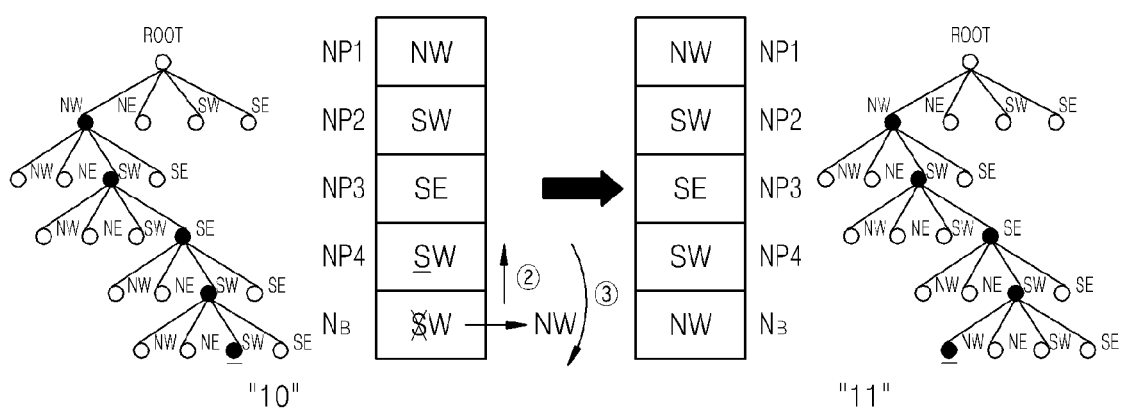
Figure 8B:
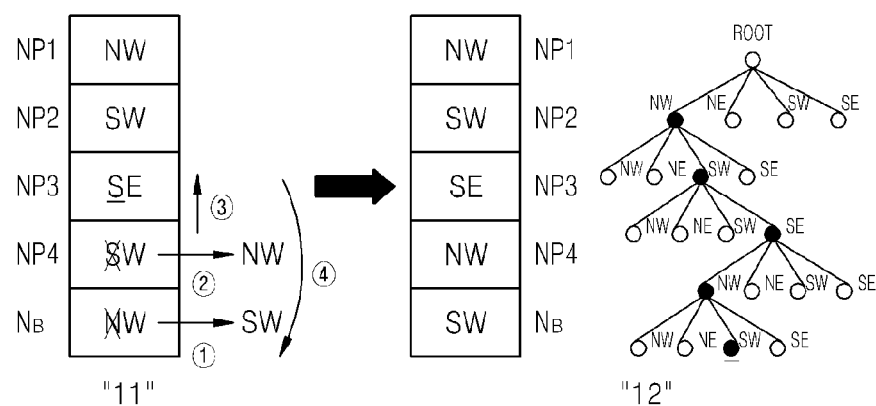

Next, a process of performing the fourth neighborhood moving algorithm in the neighborhood moving information generation unit 154 will now be described with reference to FIGS. 8A and 8B.

The neighborhood moving information generation unit 154 determines whether a bottom node $N_B$ in the plurality of pieces of first node information of the first feature data "10" includes S. Referring to FIG. 8A, since the bottom node information of the first feature data "10" is SW, a bottom node $N_B$ of the first feature data "10" includes S. In this case, the neighborhood moving information generation unit 154 changes S in the bottom node $N_B$ to N (①) and moves to parent nodes until a node including S is found (②). In FIG. 8A, since a fourth parent node NP4 is indicated by SW and includes S, the neighborhood moving information generation unit 154 moves from the bottom node $N_B$ to the fourth parent node, ends the fourth neighborhood moving algorithm, and generates a plurality of pieces of second node information of second feature data "11" as a result of combining the existing node information of the top node ROOT to the fourth parent node NP4 and the changed bottom node information (③). Thus, the generated pieces of second node information of the second feature data "11" are ROOT, NW, SW, SE, SW, and NW. If the neighborhood moving information generation unit 154 cannot find node information including S even though moving to parent nodes, that is, if S is not included in any of the fourth parent node NP4 to the top node ROOT, the search is finished by setting a result of searching from a current node (top node ROOT) to the changed bottom node $N_B$ as the plurality of pieces of second node information. Since the nodes (the fourth parent node NP4 to the top node ROOT) remaining by excluding the changed bottom node $N_B$ are already generated, the search for the plurality of pieces of second node information is quickly achieved, thereby taking less time than the conventional quadtree segmentation.

When the generation of the plurality of pieces of second node information of the second feature data "11" is completed, the second feature data "11" becomes first feature data, and a plurality of pieces of second node information of second feature data "12" located at the fourth position, i.e. on the top, with respect to the first feature data "11" are generated. The neighborhood moving information generation unit 154 determines whether a bottom node $N_B$ in the plurality of pieces of first node information of the first feature data "11" includes S, and if the bottom node of the first feature data "11" does not include S, the neighborhood moving information generation unit 154 determines whether the bottom node $N_B$ of the first feature data "11" includes N. Referring to FIG. 8B, since bottom node information of the first feature data "11" is NW, the bottom node $N_B$ of the first feature data "11" includes N. In this case, the neighborhood moving information generation unit 154 changes N in the bottom node to S and moves to a parent node (①). Thereafter, the neighborhood moving information generation unit 154 determines whether the parent node includes S. If the parent node includes S, the neighborhood moving information generation unit 154 changes S to N (②). Thereafter, the neighborhood moving information generation unit 154 moves to parent nodes until a node including S is found (③). In FIG. 8B, since a third parent node is indicated by SE and includes S, the neighborhood moving information generation unit 154 moves from the bottom node $N_B$ to the third parent node. Thereafter, the neighborhood moving information generation unit 154 ends the fourth neighborhood moving algorithm and generates the plurality of pieces of second node information of second feature data "12" as a result of combining the existing node information of the top node ROOT to the third parent node NP3, the changed fourth parent node information (②), and the changed bottom node information (④). Thus, the generated pieces of second node information of the second feature data "12" are ROOT, NW, SW, SE, NW, and SW. If the neighborhood moving information generation unit 154 cannot find node information including S even though moving to parent nodes, that is, if S is not included in any of the third parent node NP3 to the top node ROOT, the search is finished by setting a result of searching from the current node (top node ROOT) to the changed nodes (the bottom node $N_B$ and the fourth parent node NP4) as the plurality of pieces of second node information. Since the nodes (the third parent node NP3 to the top node ROOT) remaining by excluding the changed bottom node $N_B$ and the changed fourth parent node are already generated, the search for the plurality of pieces of second node information is quickly achieved, thereby taking less time than the conventional quadtree segmentation.

As described above, the fourth neighborhood moving algorithm can be separately performed for a case where a bottom node $N_B$ in a plurality of pieces of first node information of first feature data includes S and a case where the bottom node $N_B$ includes N. When the bottom node $N_B$ includes S, a plurality of pieces of second node information of second feature data are generated by only changing S in the bottom node to N. Meanwhile, when the bottom node includes N, a plurality of pieces of second node information of second feature data are generated by changing N in the bottom node to S, moving to a parent node, and changing S in the parent node to N.

As described above, the map construction unit 150 generates a plurality of pieces of second node information of second feature data by using a position determination result of the second feature data based on first feature data and using a plurality of pieces of first node information of the first feature data and constructs a map by using the plurality of pieces of first node information and the plurality of pieces of second node information.

A method of constructing a map for the mobile robot 100 according to an exemplary embodiment will now be described with reference to FIGS. 9 through 14. The method may be performed by the map construction unit 150 along with the other components of the mobile robot 100 as shown in FIG. 1. In the description below, the description made with reference to FIGS. 1 through 8B will not be repeated.

FIG. 9 is a flowchart illustrating a method of constructing a map for the mobile robot 100, according to an exemplary embodiment.

Referring to FIG. 9, in operation S100, the map construction unit 150 searches for a plurality of pieces of feature data occupying an arbitrary space $S_a$ by scanning a surrounding environment of the mobile robot 100. The map construction unit 150 may search for a plurality of pieces of feature data by scanning, also known as performing environment recognition, an arbitrary space $S_a$ by the mobile robot 100 using a distance measurement sensor including an ultrasound sensor, an infrared sensor, a laser sensor, or the like. In addition, the map construction unit 150 may search for a plurality of pieces of feature data in an image captured using an image capturing unit (not shown) including, for example, a camera, a stereo camera, or the like. The map construction unit 150 may detect an approximate position of the plurality of pieces of feature data searched through the performed environment recognition.

After the search for the plurality of pieces of feature data is completed, the map construction unit 150 performs quadtree segmentation on first feature data and generates a plurality of pieces of first node information as a result of the quadtree segmentation in operation S200. As the result of the quadtree segmentation, node information is generated in all child nodes including the first feature data except for a top node ROOT, and each node information includes any one direction of S and N and any one direction of E and W. Referring to FIGS. 2 and 3, for example, a plurality of pieces of first node information generated as a result of the quadtree segmentation of the first feature data "1" are ROOT, NW, SW, SE, NW, and NW.

After the generation of the plurality of pieces of first node information of the first feature data, the map construction unit 150 determines a position of second feature data with respect to a position of the first feature data in operation S300. The map construction unit 150 may determine the position of the second feature data that is closest to the first feature data or determine the second feature data that is sequentially found next to the first feature data from among the plurality of pieces of feature data found by the mobile robot 100. The search unit 153 may determine the position of the second feature data as one of the first to fourth positions, i.e. right, left, top and bottom, with respect to the position of the first feature data. Here, the position search is important since an operation of a neighborhood moving algorithm to be described below varies according to the position of the second feature data that is searched by the search unit 153.

After the determination of the position of the second feature data with respect to the position of the first feature data is completed, the map construction unit 150 performs a neighborhood moving algorithm for generating a plurality of pieces of second node information of the second feature data for each found position of the second feature data based on the plurality of pieces of first node information of the first feature data in operation S400. According to the related art, since the same quadtree segmentation as performed on the first feature data is required to be performed to generate the plurality of pieces of second node information of the second feature data, a long approach time is required, and the position search is complicated. However, by performing the neighborhood moving algorithm according to the current exemplary embodiment, the disadvantages described above can be solved.

Figure 10:
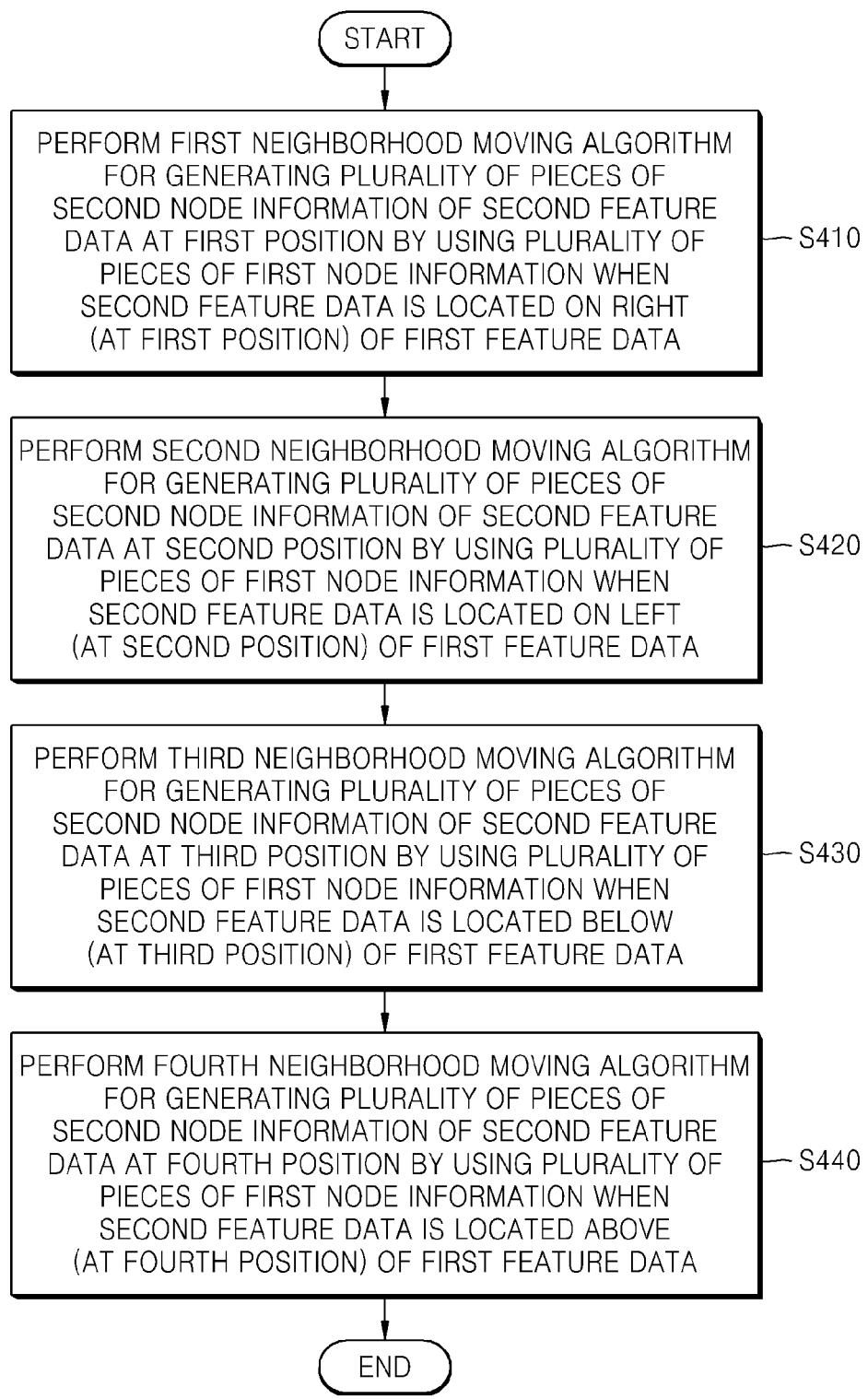
FIG. 10 is a flowchart illustrating an operation of a neighborhood moving algorithm of FIG. 9 according to an exemplary embodiment.

FIG. 10 is a flowchart illustrating an operation of the neighborhood moving algorithm of FIG. 9.

Referring to FIG. 10, in operation S410, the map construction unit 150 performs the first neighborhood moving algorithm for generating the plurality of pieces of second node information of the second feature data at the first position by using the plurality of pieces of first node information of the first feature data when the second feature data is located at the first position (on the right) of the first feature data.

In operation S420, the map construction unit 150 performs the second neighborhood moving algorithm for generating the plurality of pieces of second node information of the second feature data at the second position by using the plurality of pieces of first node information of the first feature data when the second feature data is located at the second position (on the left) of the first feature data.

In operation S430, the map construction unit 150 performs the third neighborhood moving algorithm for generating the plurality of pieces of second node information of the second feature data at the third position by using the plurality of pieces of first node information of the first feature data when the second feature data is located at the third position (below) of the first feature data.

In operation S440, the map construction unit 150 performs the fourth neighborhood moving algorithm for generating the plurality of pieces of second node information of the second feature data at the fourth position by using the plurality of pieces of first node information of the first feature data when the second feature data is located at the fourth position (above) of the first feature data.

The first through fourth neighborhood moving algorithms are not necessarily performed in the order described above, and any one of the first through fourth neighborhood moving algorithms may be performed according to the position of the second feature data.

Figure 11:
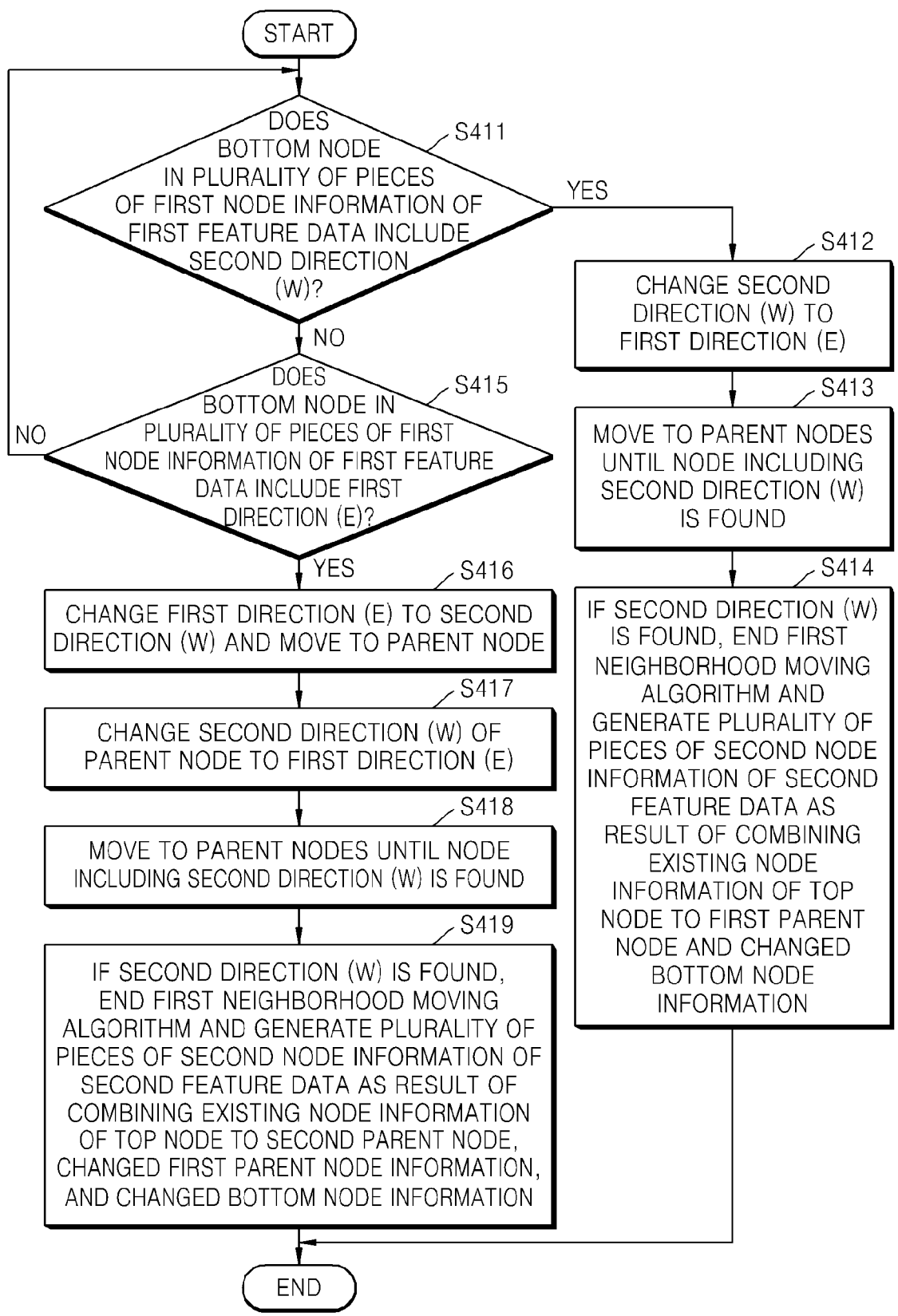
FIGS. 11 to 14 are flowcharts illustrating operations of first to fourth neighborhood moving algorithms of FIG. 10, respectively according to an exemplary embodiment.

FIG. 11 is a flowchart illustrating an operation of the first neighborhood moving algorithm S410 of FIG. 10.

Referring to FIG. 11, in operation S411, the map construction unit 150 determines whether a bottom node $N_B$ in the plurality of pieces of first node information of the first feature data includes the second direction (W).

As a result of the determination, if the bottom node $N_B$ in the plurality of pieces of first node information of the first feature data includes the second direction (W), the map construction unit 150 changes the second direction (W) to the first direction (E) in operation S412.

After the change is completed, in operation S413, the map construction unit 150 moves to parent nodes until a node including the second direction (W) is found.

If a node including the second direction (W) is found, the map construction unit 150 ends the first neighborhood moving algorithm and generates the plurality of pieces of second node information of the second feature data as a result of combining the existing node information of a top node ROOT to a fourth parent node NP4 and the changed bottom node information in operation S414.

As a result of the determination, if the bottom node $N_B$ in the plurality of pieces of first node information of the first feature data does not include the second direction (W), the map construction unit 150 determines in operation S415 whether the bottom node $N_B$ in the plurality of pieces of first node information of the first feature data includes the first direction (E).

As a result of the determination in operation S415, if the bottom node $N_B$ in the plurality of pieces of first node information of the first feature data includes the first direction (E), the map construction unit 150 changes the first direction (E) to the second direction (W) and moves to a parent node in operation S416.

After the movement to the parent node is completed, the map construction unit 150 changes the second direction (W) of the parent node including the second direction (W) to the first direction (E) in operation S417.

After the change in operation S417 is completed, in operation S418, the map construction unit 150 moves to parent nodes until a node including the second direction (W) is found.

If a node including the second direction (W) is found, the map construction unit 150 ends the first neighborhood moving algorithm and generates the plurality of pieces of second node information of second feature data as a result of combining the existing node information of the top node ROOT to a third parent node NP3, the changed fourth parent node information, and the changed bottom node information in operation S419.

If node information including the second direction (W) is not found even though operations S413 and S418 are performed, the search is finished by setting the node change result for up until the present (the result of changing only the bottom node or the result of changing only the bottom node $N_B$ and the fourth parent node NP4) as the plurality of pieces of second node information.

As described above, the first neighborhood moving algorithm can be separately performed for a case where a bottom node $N_B$ in a plurality of pieces of first node information of first feature data includes W and a case where the bottom node $N_B$ includes E. When the bottom node $N_B$ includes W, a plurality of pieces of second node information of second feature data are generated by only changing W in the bottom node to E. Meanwhile, when the bottom node $N_B$ includes E, a plurality of pieces of second node information of second feature data are generated by changing E in the bottom node to W, moving to a parent node, and changing W in the parent node to E.

Figure 12:
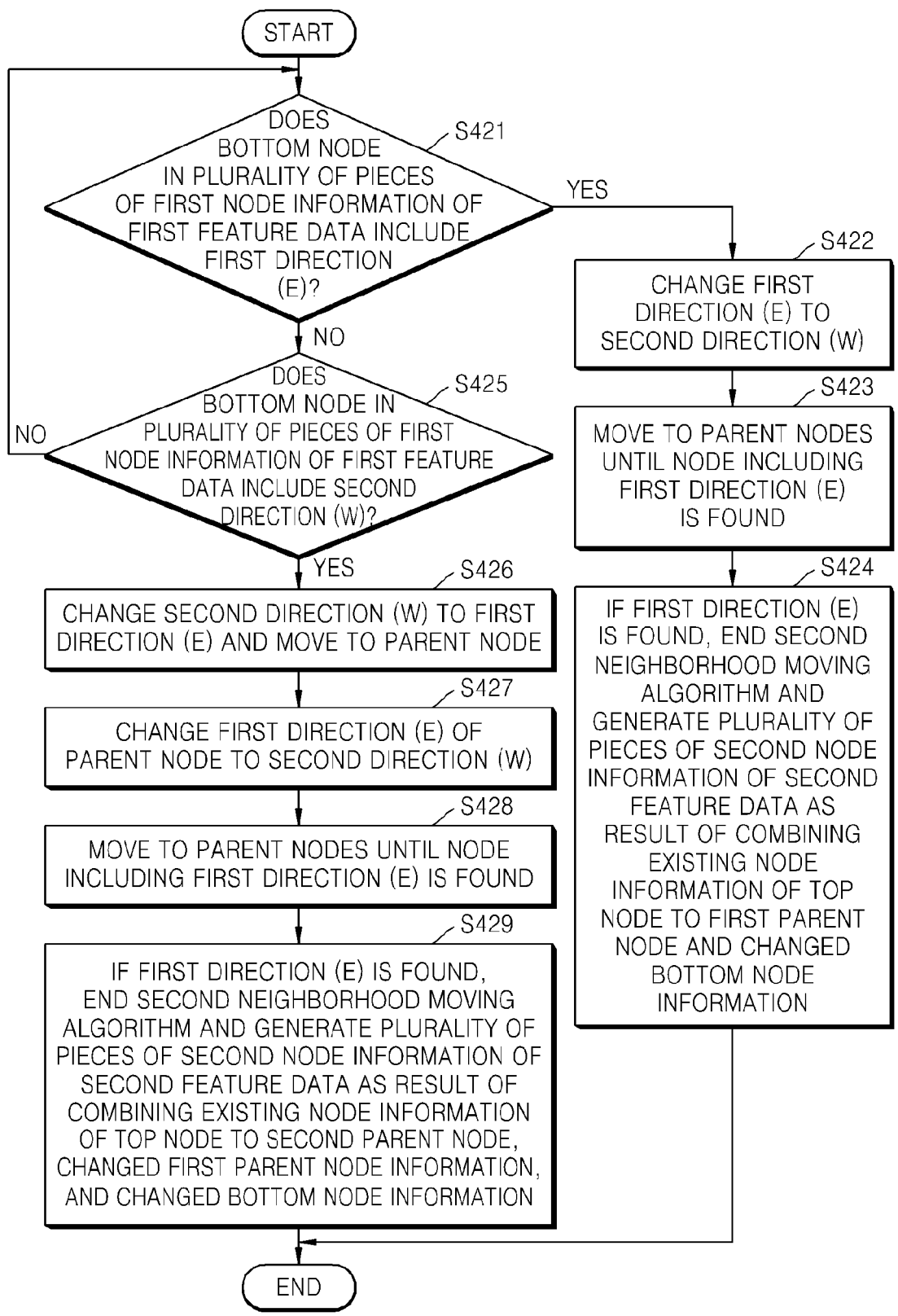

FIG. 12 is a flowchart illustrating an operation of the second neighborhood moving algorithm of FIG. 10.

Referring to FIG. 12, in operation S421, the map construction unit 150 determines whether a bottom node $N_B$ in the plurality of pieces of first node information of the first feature data includes the first direction (E).

As a result of the determination, if the bottom node $N_B$ in the plurality of pieces of first node information of the first feature data includes the first direction (E), the map construction unit 150 changes the first direction (E) to the second direction (W) in operation S422.

After the change is completed, in operation S423, the map construction unit 150 moves to parent nodes until a node including the first direction (E) is found.

If a node including the first direction (E) is found, the map construction unit 150 ends the second neighborhood moving algorithm and generates the plurality of pieces of second node information of the second feature data as a result of combining the existing node information of a top node ROOT to a fourth parent node NP4 and the changed bottom node information in operation S424.

As a result of the determination, if the bottom node in the plurality of pieces of first node information of the first feature data does not include the first direction (E), the map construction unit 150 determines in operation S425 whether the bottom node in the plurality of pieces of first node information of the first feature data includes the second direction (W).

As a result of the determination in operation S425, if the bottom node in the plurality of pieces of first node information of the first feature data includes the second direction (W), the map construction unit 150 changes the second direction (W) to the first direction (E) and moves to a parent node in operation S426.

After the movement to the parent node is completed, the map construction unit 150 changes the first direction (E) of the parent node including the first direction (E) to the second direction (W) in operation S427.

After the change in operation S427 is completed, in operation S428, the map construction unit 150 moves to parent nodes of the parent node until a node including the first direction (E) is found.

If a node including the first direction (E) is found, the map construction unit 150 ends the second neighborhood moving algorithm and generates the plurality of pieces of second node information of second feature data as a result of combining the existing node information of the top node ROOT to a third parent node NP3, the changed fourth parent node information, and the changed bottom node information in operation S429.

If node information including the first direction (E) is not found even though operations S423 and S428 are performed, the search is finished by setting the node change result for up until the present (the result of changing only the bottom node $N_B$ or the result of changing only the bottom node $N_B$ and the fourth parent node NP4) as the plurality of pieces of second node information.

As described above, the second neighborhood moving algorithm can be separately performed for a case where a bottom node $N_B$ in a plurality of pieces of first node information of first feature data includes E and a case where the bottom node $N_B$ includes W. When the bottom node $N_B$ includes E, a plurality of pieces of second node information of second feature data are generated by only changing E in the bottom node to W. Meanwhile, when the bottom node $N_B$ includes W, a plurality of pieces of second node information of second feature data are generated by changing W in the bottom node to E, moving to a parent node, and changing E in the parent node to W.

Figure 13:
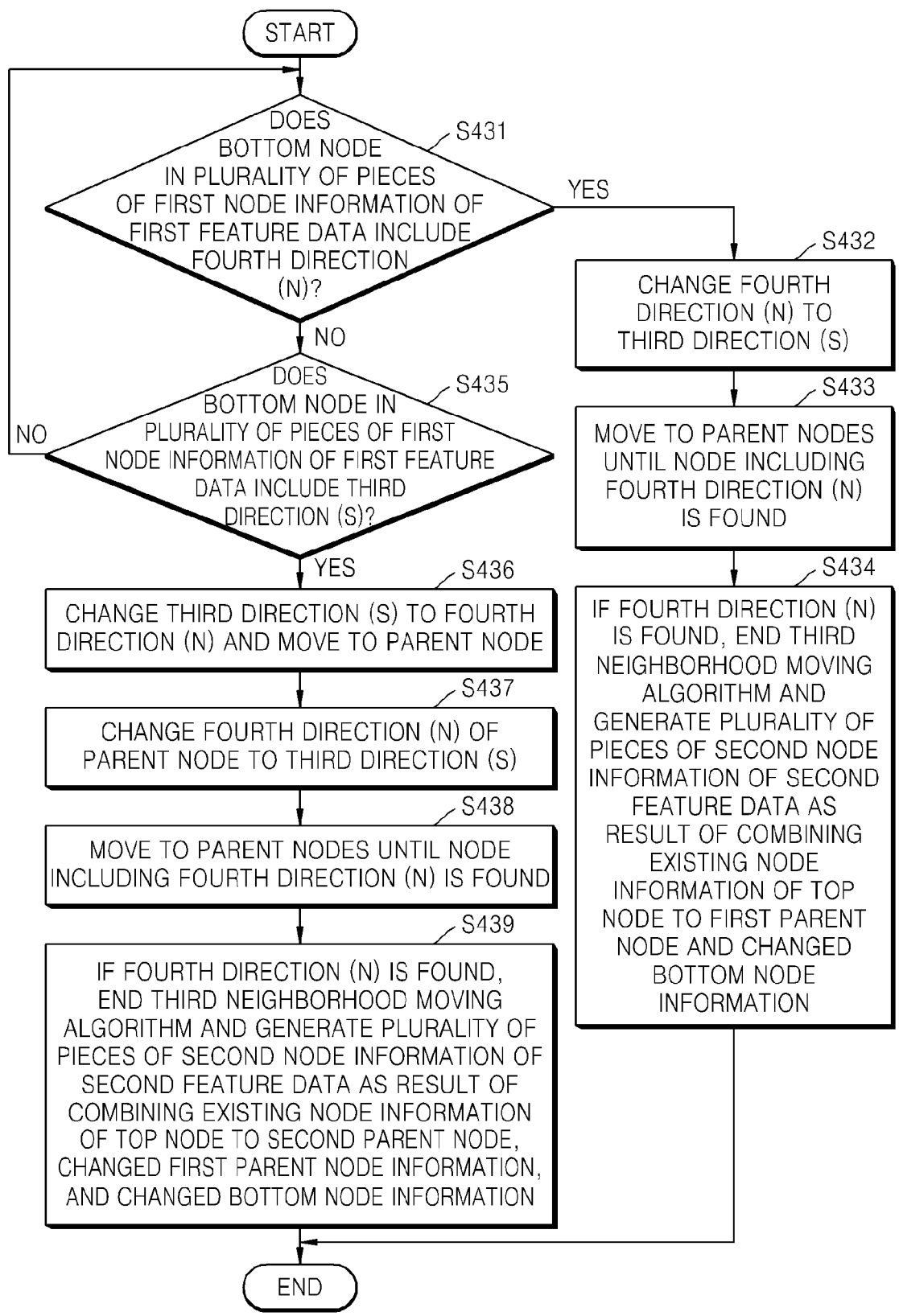

FIG. 13 is a flowchart illustrating an operation of the third neighborhood moving algorithm of FIG. 10.

Referring to FIG. 13, in operation S431, the map construction unit 150 determines whether a bottom node $N_B$ in the plurality of pieces of first node information of the first feature data includes the fourth direction (N).

As a result of the determination, if the bottom node $N_B$ in the plurality of pieces of first node information of the first feature data includes the fourth direction (N), the map construction unit 150 changes the fourth direction (N) to the third direction (S) in operation S432.

After the change is completed, in operation S433, the map construction unit 150 moves to parent nodes until a node including the fourth direction (N) is found.

If a node including the fourth direction (N) is found, the map construction unit 150 ends the third neighborhood moving algorithm and generates the plurality of pieces of second node information of the second feature data as a result of combining the existing node information of a top node ROOT to a fourth parent node NP4 and the changed bottom node information in operation S434.

As a result of the determination, if the bottom node $N_B$ in the plurality of pieces of first node information of the first feature data does not include the fourth direction (N), the map construction unit 150 determines in operation S435 whether the bottom node $N_B$ in the plurality of pieces of first node information of the first feature data includes the third direction (S).

As a result of the determination in operation S435, if the bottom node $N_B$ in the plurality of pieces of first node information of the first feature data includes the third direction (S), the map construction unit 150 changes the third direction (S) to the fourth direction (N) and moves to a parent node in operation S436.

After the movement to the parent node is completed, the map construction unit 150 changes the fourth direction (N) of the parent node including the fourth direction (N) to the third direction (S) in operation S437.

After the change in operation S437 is completed, in operation S438, the map construction unit 150 moves to parent nodes until a node including the fourth direction (N) is found.

If a node including the fourth direction (N) is found, the map construction unit 150 ends the third neighborhood moving algorithm and generates the plurality of pieces of second node information of second feature data as a result of combining the existing node information of the top node ROOT to a third parent node NP3, the changed fourth parent node information, and the changed bottom node information in operation S439.

If node information including the fourth direction (N) is not found even though operations S433 and S438 are performed, the search is finished by setting the node change result for up until the present (the result of changing only the bottom node $N_B$ or the result of changing only the bottom node $N_B$ and the fourth parent node NP4) as the plurality of pieces of second node information.

As described above, the third neighborhood moving algorithm can be separately performed for a case where a bottom node $N_B$ in a plurality of pieces of first node information of first feature data includes N and a case where the bottom node $N_B$ includes S. When the bottom node includes N, a plurality of pieces of second node information of second feature data are generated by only changing N in the bottom node $N_B$ to S. Meanwhile, when the bottom node includes S, a plurality of pieces of second node information of second feature data are generated by changing S in the bottom node $N_B$ to N, moving to a parent node, and changing N in the parent node to S.

Figure 14:
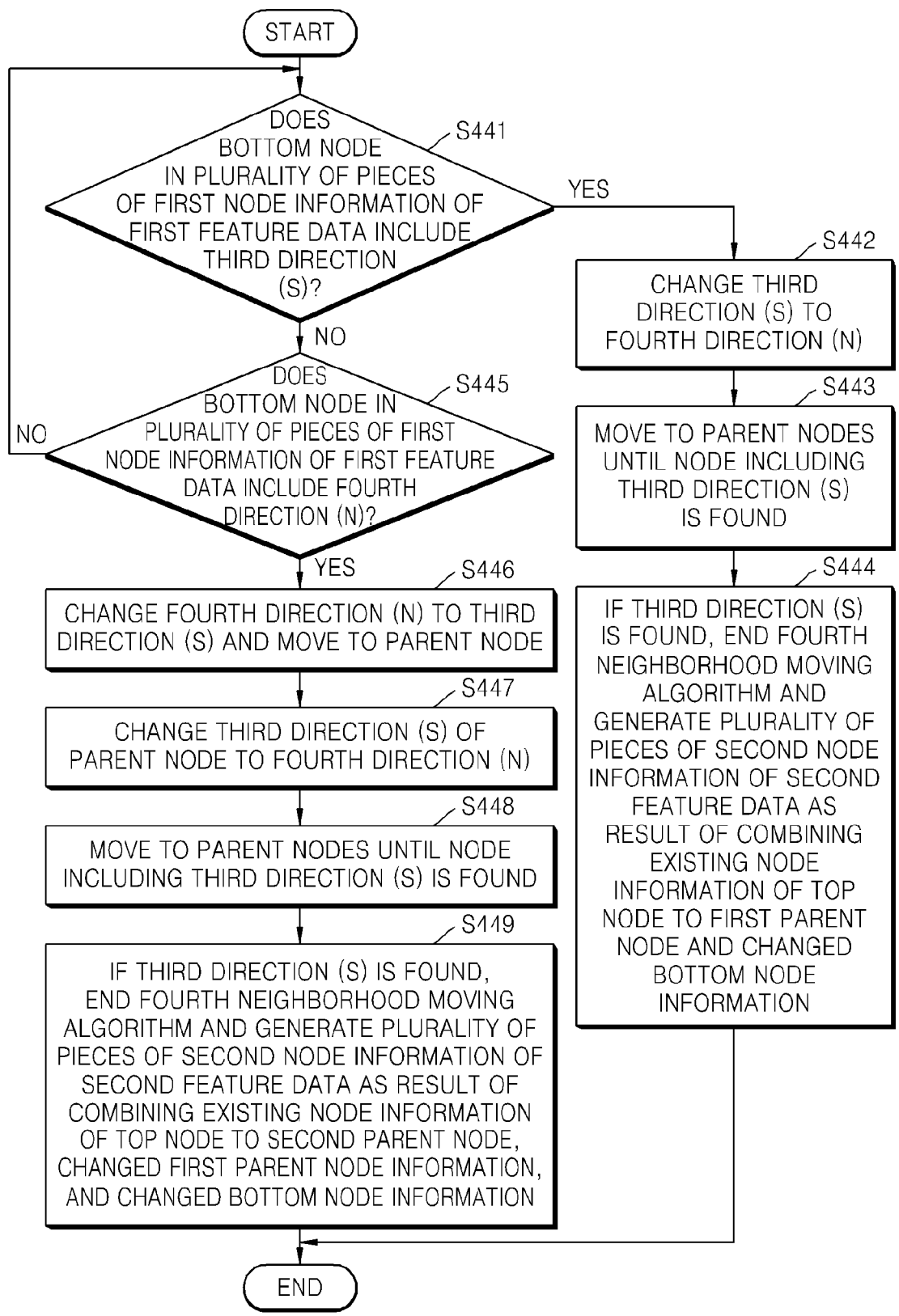

FIG. 14 is a flowchart illustrating an operation of the fourth neighborhood moving algorithm of FIG. 10.

Referring to FIG. 14, in operation S441, the map construction unit 150 determines whether a bottom node $N_B$ in the plurality of pieces of first node information of the first feature data includes the third direction (S).

As a result of the determination, if the bottom node $N_B$ in the plurality of pieces of first node information of the first feature data includes the third direction (S), the map construction unit 150 changes the third direction (S) to the fourth direction (N) in operation S442.

After the change is completed, in operation S443, the map construction unit 150 moves to parent nodes until a node including the third direction (S) is found.

If a node including the third direction (S) is found, the map construction unit 150 ends the fourth neighborhood moving algorithm and generates the plurality of pieces of second node information of the second feature data as a result of combining the existing node information of a top node ROOT to a fourth parent node NP4 and the changed bottom node information in operation S444.

As a result of the determination, if the bottom node $N_B$ in the plurality of pieces of first node information of the first feature data does not include the third direction (S), the map construction unit 150 determines in operation S445 whether the bottom node $N_B$ in the plurality of pieces of first node information of the first feature data includes the fourth direction (N).

As a result of the determination in operation S445, if the bottom node $N_B$ in the plurality of pieces of first node information of the first feature data includes the fourth direction (N), the map construction unit 150 changes the fourth direction (N) to the third direction (S) and moves to a parent node in operation S446.

After the movement to the parent node is completed, the map construction unit 150 changes the third direction (S) of the parent node including the third direction (S) to the fourth direction (N) in operation S447.

After the change in operation S447 is completed, in operation S448, the map construction unit 150 moves to parent nodes until a node including the third direction (S) is found.

If a node including the third direction (S) is found, the map construction unit 150 ends the fourth neighborhood moving algorithm and generates the plurality of pieces of second node information of second feature data as a result of combining the existing node information of the top node ROOT to a third parent node NP3, the changed fourth parent node information, and the changed bottom node information in operation S449.

If node information including the third direction (S) is not found even though operations S443 and S448 are performed, the search is finished by setting the node change result for up until the present (the result of changing only the bottom node $N_B$ or the result of changing only the bottom node $N_B$ and the fourth parent node NP4) as the plurality of pieces of second node information.

As described above, the fourth neighborhood moving algorithm can be separately performed for a case where a bottom node $N_B$ in a plurality of pieces of first node information of first feature data includes S and a case where the bottom node $N_B$ includes N. When the bottom node $N_B$ includes S, a plurality of pieces of second node information of second feature data are generated by only changing S in the bottom node to N. Meanwhile, when the bottom node $N_B$ includes N, a plurality of pieces of second node information of second feature data are generated by changing N in the bottom node to S, moving to a parent node, and changing S in the parent node to N.

Referring back to FIG. 9, the map construction unit 150 constructs a map by using the plurality of pieces of first node information of the first feature data and the plurality of pieces of second node information of the second feature data in operation S500. In the current exemplary embodiment, the first feature data and the second feature data are defined as the plurality of pieces of feature data, and the map is constructed using the plurality of pieces of first node information generated from the first feature data and the plurality of pieces of second node information generated from the second feature data.

As described above, according to exemplary embodiments, a data amount can be reduced, and an approach speed can be increased, so that a mobile robot is operable over a wide area.

The present inventive concepts may also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and the implemented in the form of carrier waves (for example, data transmission through the Internet). The computer-readable recording medium can also be distributed over network coupled computer systems so that the computer-readable code is stored and executed in a distributed fashion. Also, functional programs, codes, and code segments for accomplishing the present inventive concepts can be easily construed by programmers skilled in the art.

While exemplary embodiments have been particularly shown and described above, it will be understood by one of ordinary skill in the art that various changes in form and details may be made therein without departing from the spirit and scope of the inventive concepts as defined by the following claims. The exemplary embodiments should be considered in a descriptive sense only and not for purposes of limitation. Therefore, the scope of the present inventive concepts is defined not by the detailed description of the disclosure but by the appended claims, and all differences within the scope will be construed as being included in the exemplary embodiments.

What is claimed is:

1. A method of constructing a map for a mobile robot, the method comprising:
    searching, by at least one processor, for a plurality of feature data occupying an arbitrary space by scanning a surrounding environment of the mobile robot;
    performing quadtree segmentation, by the at least one processor, on first feature data of the plurality of feature data to generate a plurality of first node information;
    determining, by the at least one processor, a position of second feature data of the plurality of feature data with respect to the first feature data; and
    performing, by the at least one processor, a neighborhood moving algorithm for generating a plurality of second node information of the second feature data according to the position of second feature data by using the plurality of first node information.

2. The method of claim 1, wherein the determining the position comprises determining the second feature data being in one of a first position, a second position, a third position and a fourth position,
    wherein the first, second, third and fourth positions are located orthogonally from one another.

3. The method of claim 2, wherein the performing the neighborhood moving algorithm comprises performing one of a first neighborhood moving algorithm, a second neighborhood moving algorithm, a third neighborhood moving algorithm and a fourth neighborhood moving algorithm for generating the plurality of second node information of the second feature data according to the determined position of the second feature data.

4. The method of claim 3, wherein the performing the one of the first, second, third and fourth neighborhood moving algorithm comprises:
    performing the first neighborhood moving algorithm for generating the plurality of second node information of the second feature data in response to the determined position being the first position;

performing the second neighborhood moving algorithm for generating the plurality of second node information of the second feature data in response to the determined position being the second position;

performing the third neighborhood moving algorithm for generating the plurality of second node information of the second feature data in response to the determined position being the third position; and performing the fourth neighborhood moving algorithm for generating the plurality of second node information of the second feature data in response to the determined position being the fourth position.

5. The method of claim 3, wherein the performing the one of the first, second, third and fourth neighborhood moving algorithm comprises determining whether a bottom node in the plurality of first node information of the first feature data comprises a determining direction opposite from a direction extending from the first feature data to the determined position of the second feature data.

6. The method of claim 5, wherein the performing the one of the first, second, third and fourth neighborhood moving algorithm further comprises generating a first plurality of second node information of the second feature data in response to the bottom node in the plurality of first node information of the first feature data having the determining direction.

7. The method of claim 6, wherein the performing the one of the first, second, third and fourth neighborhood moving algorithm further comprises generating a second plurality of second node information of the second feature data in response to the bottom node in the plurality of first node information of the first feature data having the direction from the first feature data to the determined position of the second feature data.

8. The method of claim 7, wherein the generating the first plurality of second node information of the second feature data comprises:

changing the determining direction of the bottom node in the plurality of first node information of the first feature data to the direction from the first feature data to the determined position of the second feature data; and generating the plurality of second node information of the second feature data as a result of combining the changed bottom node of the first node information and remaining nodes of the first node information.

9. The method of claim 7, wherein the generating the second plurality of second node information of the second feature data comprises:

changing the direction from the first feature data to the determined position of the second feature data of the bottom node in the plurality of first node information of the first feature data to the determining direction and moving to a parent node of the bottom node;

changing the determining direction of the parent node to the direction from the first feature data to the determined position of the second feature data; and generating the plurality of second node information of the second feature data as a result of combining the changed bottom node and the changed parent node of the first node information and remaining nodes of the first node information.

10. An apparatus for constructing a map for a mobile robot, the apparatus comprising:

an environment recognizer configured to search for a plurality of feature data occupying an arbitrary space by scanning a surrounding environment of the mobile robot;

a quadtree information generator configured to perform quadtree segmentation on first feature data of the plurality of feature data to generate a plurality of first node information;

a searcher configured to determine a position of second feature data of the plurality of feature data with respect to the first feature data; and a neighborhood moving information generator configured to perform a neighborhood moving algorithm for generating a plurality of second node information of the second feature data according to the position of second feature data by using the plurality of first node information.

11. The apparatus of claim 10, wherein the searcher is configured to determine the second feature data being in one of a first position, second position, a third position and a fourth position, wherein the first, second, third and fourth positions are located orthogonally from one another.

12. The apparatus of claim 11, wherein the neighborhood moving information generator is configured to perform one of a first neighborhood moving algorithm, a second neighborhood moving algorithm, a third neighborhood moving algorithm and a fourth neighborhood moving algorithm for generating the plurality of second node information of the second feature data according to the position of the second feature data.

13. The apparatus of claim 12, wherein the neighborhood moving information generator is configured to perform the first neighborhood moving algorithm for generating the plurality of second node information of the second feature data in response to the determined position being the first position, performs the second neighborhood moving algorithm for generating the plurality of second node information of the second feature data in response to the determined position being the second position, performs the third neighborhood moving algorithm for generating the plurality of second node information of the second feature data in response to the determined position being the third position, and performs the fourth neighborhood moving algorithm for generating the plurality of second node information of the second feature data in response to the determined position being the fourth position.

14. The apparatus of claim 12, wherein the neighborhood moving information generator is configured to determine whether a bottom node in the plurality of first node information of the first feature data comprises a determining direction opposite from a direction extending from the first feature data to the determined position of the second feature data.

15. The apparatus of claim 14, wherein the neighborhood moving information generator is configured to generate a first plurality of second node information of the second feature data in response to the bottom node in the plurality of first node information of the first feature data having the determining direction.

16. The apparatus of claim 15, wherein the neighborhood moving information generator is configured to generate a second plurality of second node information of the second feature data in response to the bottom node in the plurality of first node information of the first feature data having the direction from the first feature data to the determined position of the second feature data.

17. The apparatus of claim 16, wherein the neighborhood moving information generator is configured to change the determining direction of a bottom node in the plurality of first node information of the first feature data to the direction from the first feature data to the determined position of the second feature data and generates the first plurality of second node information of the second feature data as a result of combining the changed bottom node of the first node information and remaining nodes of first node information.

18. The apparatus of claim 16, wherein the neighborhood moving information generator is configured to change the direction from the first feature data to the determined position of the second feature data of the bottom node in the plurality of first node information of the first feature data to the determining direction, moves to a parent node of the bottom node, changes the determining direction to the direction from the first feature data to the determined position of the second feature data, and generates the second plurality of second node information of the second feature data as a result of combining the changed bottom node and the changed parent node of the first node information, and the remaining nodes of the first node information.

* * * * *